(12) United States Patent
Hessler

(10) Patent No.: US 8,935,769 B2
(45) Date of Patent: Jan. 13, 2015

(54) METHOD FOR MOBILE SECURITY VIA MULTI-FACTOR CONTEXT AUTHENTICATION

(71) Applicant: Christian J. Hessler, Westminister, CO (US)

(72) Inventor: Christian J. Hessler, Westminister, CO (US)

(73) Assignee: LiveEnsure, Inc., Westminster, CO (US)

( * ) Notice: Subject to any disclaimer, the term of this patent is extended or adjusted under 35 U.S.C. 154(b) by 173 days.

(21) Appl. No.: 13/803,796

(22) Filed: Mar. 14, 2013

(65) Prior Publication Data

US 2014/0096215 A1     Apr. 3, 2014

Related U.S. Application Data

(60) Provisional application No. 61/707,190, filed on Sep. 28, 2012.

(51) Int. Cl.
| H04L 29/06 | (2006.01) |
| H04W 12/06 | (2009.01) |
| G06F 21/30 | (2013.01) |

(52) U.S. Cl.
CPC ............ H04L 63/08 (2013.01); H04L 63/0869 (2013.01); H04W 12/06 (2013.01); G06F 21/30 (2013.01)
USPC ................................................ 726/7; 713/171

(58) Field of Classification Search
CPC ................................ H04L 63/08; G06F 21/30
USPC ............................................................ 726/7
See application file for complete search history.

(56) References Cited

U.S. PATENT DOCUMENTS

| 6,993,658 | B1 | 1/2006 | Engberg et al. |
| 7,174,031 | B2 | 2/2007 | Rhoads et al. |
| 7,237,117 | B2 | 6/2007 | Weiss |
| 7,805,372 | B2 | 9/2010 | Weiss |
| 7,806,322 | B2 | 10/2010 | Brundage et al. |

(Continued)

FOREIGN PATENT DOCUMENTS

| EP | 2378451 | 10/2011 |
| GB | 1206036.4 | 4/2012 |

(Continued)

OTHER PUBLICATIONS

Kuan-Chieh et al., "A Novel User Authentication Scheme Based on QR Code", Journal of Networks, Aug. 2010, vol. 5, Academy Publisher, Taiwan http://ojs.academypublisher.com/index.php/jnw/article/view/0508937941/2055.

(Continued)

*Primary Examiner* — Hadi Armouche
*Assistant Examiner* — Bryan Wright
(74) *Attorney, Agent, or Firm* — Marc E. Hankin; Jimmy Sauz; Hankin Patent Law, APC

(57) ABSTRACT

The present invention is a system and a method for improving the authentication security across a network from a mobile electronic computing device in the context of one or more users, devices, sites/sessions, servers, locations, proximity, motion and/or behavioral attributes within a defined session lifecycle. The authentication method and system utilizes a strong, elegant, private, definitive and real-time, triangulated verification, which requires mutual authentication between the parties.

20 Claims, 6 Drawing Sheets

| U = user | H = host | S = service, server | C = channel |
|---|---|---|---|
| N = session | P = presentation | T = template | F = factor |
| X = decision | L = location | B = behavior | O = object |
| R = registration | D = device | A = app | Y = profile algorithm |

| U1 = main user | T0 = service template | Ul = user location |
|---|---|---|
| H1 = main host | T1 = user/device template | PL = presentation location |
| N1 = main session | FX = all/any factors | HL = host location |
| C1 = user channel | FD = device factors | DL = device location |
| C2 = host channel | FP = personal factors | X0 = server signature |
| C3 = smart channel | FL = location factor | X1 = device/user signature |
| C4 = oob channel | FB = behavior factor | O1 = link object |
| D1 = original device | FC = custom factor | R0 = first registration |
| DN = additional dev | FO = OOB factor (OOB) | RN = subsequent reg/re-reg |

| Cp = custom pin | Bg = behavior gesture | Lo = location original |
|---|---|---|
| Cc = custom chall | Bo = behavior orientation | Lp = location proximity |
| Cf = custom 3rd pty | Bm = behavior motion | Lr = location registration |
| Co = custom oob | Bh = behavior historical | Lg = location geofence |
| SSO = single sign on | Bc = behavior custom | La = location associative |
| AX = the context | NFC = near field comm | Lh = location historical |

(56) References Cited

U.S. PATENT DOCUMENTS

| | | | |
|---|---|---|---|
| 7,809,651 B2 | 10/2010 | Weiss | |
| 7,822,411 B2 | 10/2010 | Nakatani | |
| 7,870,599 B2 | 1/2011 | Pemmaraju | |
| 8,001,055 B2 | 8/2011 | Weiss | |
| 8,006,291 B2* | 8/2011 | Headley et al. | 726/7 |
| 8,028,896 B2 | 10/2011 | Carter et al. | |
| 8,112,787 B2 | 2/2012 | Buer | |
| 8,150,108 B2 | 4/2012 | Miller | |
| 8,174,503 B2 | 5/2012 | Chin | |
| 8,181,234 B2 | 5/2012 | Ishida | |
| 8,271,802 B2 | 9/2012 | Orsini et al. | |
| 8,448,238 B1* | 5/2013 | Gupta et al. | 726/15 |
| 2004/0012569 A1 | 1/2004 | Hara | |
| 2004/0171399 A1 | 9/2004 | Uchida et al. | |
| 2006/0161789 A1 | 7/2006 | Doughty et al. | |
| 2007/0106892 A1 | 5/2007 | Engberg | |
| 2007/0133843 A1 | 6/2007 | Nakatani | |
| 2007/0168674 A1 | 7/2007 | Nonaka et al. | |
| 2008/0005576 A1 | 1/2008 | Weiss | |
| 2009/0292641 A1 | 11/2009 | Weiss | |
| 2011/0219427 A1 | 9/2011 | Hito et al. | |
| 2012/0016731 A1 | 1/2012 | Smith et al. | |
| 2012/0066501 A1* | 3/2012 | Xiong | 713/171 |
| 2012/0091202 A1 | 4/2012 | Cohen | |
| 2012/0138679 A1 | 6/2012 | Doyle | |

FOREIGN PATENT DOCUMENTS

| | | |
|---|---|---|
| WO | WO/95/24696 | 9/1995 |
| WO | WO/00/75760 | 12/2000 |
| WO | WO/02/41114 | 5/2002 |
| WO | WO/2004/008683 | 1/2004 |
| WO | WO/2012/069845 | 5/2012 |

OTHER PUBLICATIONS

Kuan-Chieh et al., "A One-Time Password Scheme with QR-Code Based on Mobile Phone," ncm, pp. 2069-2071, 2009 Fifth International Joint Conference on INC, IMS and IDC, 2009 http://ieeexplore.ieee.org/xpl/login.jsp?tp=&arnumber=5331599&url=http%3A%2F%2Fieeexplore.ieee.org%2Fxpls%2Fabs_all.jsp%3Farnumber%3D5331599.

Madsen, Paul E., "QR codes for two-factor authentication", Nov. 22, 2005. http://connectid.blogspot.com/2005/11/qr-codes-for-two-factor-authentication.html.

Starnberger, Guenther, et al., "QR-TAN: Secure Mobile Authentication", 2009 International Conference on Availability, Reliability and Security, Vienna University of Technology, Institute of Information Systems, Vienna, Austria https://guenther.starnberger.name/publications/ares09_qrtan.pdf.

Dodson, Ben et al., "Snap2Pass: Consumer Friendly Challenge-Response Authentication with a Phone", Stanford University Security Workshop, Apr. 30, 2010. http://forum.stanford.edu/events/2010slides/security/BenDodson.pdf.

Kuan-Chieh et al., "A One-Time Password Scheme with QR-Code Based on Mobile Phone," journal, ncm, pp. 2069-2071, 2009 Fifth International Joint Conference on INC, IMS and IDC, 2009 http://ieeexplore.ieee.org/xpl/login.jsp?tp=&arnumber=5331599&url=http%3A%2F%2Fieeexplore.ieee.org%2Fxpls%2Fabs_all.jsp%3Farnumber%3D5331599.

Potoczny-Jones, Isaac, "Quick authentication using mobile devices and QR Codes", article, Galois, Inc., Jan. 5, 2011 http://corp.galois.com/blog/2011/1/5/quick-authentication-using-mobile-devices-and-qr-codes.html.

Gurintto, "Wave your phone at the screen to log in!", video, Youtube, Inc., Feb. 15, 2011, http://www.youtube.com/watch?v=q717DSfWxto.

"Tiqr Mobile Authentication", product and video, Egeniq http://www.egeniq.com/projects/tiqr/, Jan. 2010.

"QR codes for two-factor authentication", blog, ConnectID, Nov. 22, 2005 http://connectid.blogspot.com/2005/11/qr-codes-for-two-factor-authentication.html.

"QR code management service", article, Drupal, Nov. 12, 2009 http://drupal.org/project/d2c.

"Open Sesame App: Use smartphones to securely authenticate through the back door", article, halfbakery.com, Feb. 15, 2011. http://www.halfbakery.com/idea/Open_20Sesame_20App.

Liu, Shiyang, "Anti-counterfeit System Based on Mobile Phone QR Code and Fingerprint", journal, Intelligent Human-Machine Systems and Cybernetics (IHMSC), 2010 2nd International Conference on Aug. 2010, Dept. of Electron. Inf. & Eng., China Univ. of Geosci., Wuhan, China http://ieeexplore.ieee.org/xpl/login.jsp?tp=&arnumber=5590880&url=http%3A%2F%2Fieeexplore.ieee.org%2Fxpls%.

"Digital signature on paper", article, halfbaker.com, Nov. 12, 2009. http://www.halfbakery.com/idea/digital_20signature_20on_20paper.

"welcome to shrewd ideas, web authentication systems", blog, idea blog, http://shrewdideas.co.uk, Jul. 2010. http://shrewdideas.co.uk/ideablog/?m=201007.

"Microsoft Tag: Device ID", product, Microsoft, United States http://tag.microsoft.com/developer/device-id.aspx, Mar. 2010.

"Mobile Phone Location Verifies: Proximity to Transact", product, xyverify.com, United States http://www.xyverify.com/index.php, Jan. 3, 2012.

Homepage, website, Iproof.com http://www.iproof.com/, Jun. 2011.

"Highly secure authentication via smartphone and Quick Response Code", product and datasheet, Pirean. http://www.pirean.com/software/qryptologin/ http://www.pirean.com/pdf/Pirean_QRyptoLogin_Datasheet.pdf, Jan. 2002.

Logmote, product http://www.logmote.com/index.html, Jul. 2012.

Betts, Bryan, "Vasco targets SMB security with two-factor authentication service", article, Apr. 24, 2012, United Kingdom. http://www.cloudpro.co.uk/cloud-essentials/cloud-security/3437/vasco-targets-smb-security-two-factor-authentication-service.

Nexus Mobile Banking, Product Datasheet http://www.nexussafe.com/Global/pdf/product%20sheet/Nexus%20Mobile%20Everywhere/Nexus%20Mobile%20banking.pdf, Jan. 2009.

QRAuth, "Login to any website using QR Codes", product/service http://www.computingobjects.com/qrauthinfo/, Jan. 2012.

"SnapTags: The Mobile Barcode for Brand Marketing", product/service http://www.spyderlynk.com/, Apr. 2010.

Sonic Notify, product/service http://sonicnotify.com/, Jan. 2011.

David, Bernardo Machado et al., "A Framework for Secure Single Sign-On", Article, Brazil, Mar. 2009.

Coleman, Jason, "QR Codes: What Are They and Why Should You Care?", 2011, Kansas State University, Kansas, United States.

Maritz, Adrian, "Secure Payments Using Mobile Device", Jan. 5, 2011, United States.

Dodson, Ben et al. "Secure, Consumer-Friendly Web Authentication and Payments with a Phone" Stanford University, United States, MobiCase Oct. 2010.

Dodson, Ben et al. "The Junction Protocol for Ad Hoc Peer-to-Peer Mobile Applications" Stanford University, United States, Dec. 2010.

Balaji, N. Prasanna, "Web-Based System—Authentication to Single Log-on to Several Applications" International Journal of Computer Science and Telecommunications, Journal, Oct. 2011, India.

The International Searching Authortiy, Notification of Transmittal of the International Search Report and the Written Opinion of the International Searching Authority, Jun. 3, 2013, 1 page, United States.

The International Searching Authortiy, International Search Report, Jun. 3, 2013, 2 pages, United States.

The International Searching Authortiy, Written Opinion of the International Searching Authority, Jun. 3, 2013, 4 pages, United States.

The International Searching Authority, PCT Recordation of Search History, 33 pages, United States, May 20, 2013.

Dodson, Ben, "2010 Security Workshop", Brochure, Apr. 30, 2010, Stanford University, United States.

* cited by examiner

| U = user | H = host | S = service, server | C = channel |
|---|---|---|---|
| N = session | P = presentation | T = template | F = factor |
| X = decision | L = location | B = behavior | O = object |
| R = registration | D = device | A = app | Y = profile algorithm |

| U1 = main user | T0 = service template | Ul = user location |
|---|---|---|
| H1 = main host | T1 = user/device template | PL = presentation location |
| N1 = main session | FX = all/any factors | HL = host location |
| C1 = user channel | FD = device factors | DL = device location |
| C2 = host channel | FP = personal factors | X0 = server signature |
| C3 = smart channel | FL = location factor | X1 = device/user signature |
| C4 = oob channel | FB = behavior factor | 01 = link object |
| D1 = original device | FC = custom factor | R0 = first registration |
| DN = additional dev | FO = OOB factor (OOB) | RN = subsequent reg/re-reg |

| Cp = custom pin | Bg = behavior gesture | Lo = location original |
|---|---|---|
| Cc = custom chall | Bo = behavior orientation | Lp = location proximity |
| Cf = custom 3rd pty | Bm = behavior motion | Lr = location registration |
| Co = custom oob | Bh = behavior historical | Lg = location geofence |
| SSO = single sign on | Bc = behavior custom | La = location associative |
| AX = the context | NFC = near field comm | Lh = location historical |

FIG. 1

METHOD FOR MOBILE SECURITY VIA MULTI-FACTOR CONTEXT AUTHENTICATION

CROSS-REFERENCE TO RELATED APPLICATIONS

This application takes priority from U.S. Provisional Patent Application No. 61/707,190, filed on Sep. 28, 2012, titled "Mobile Security Context Authentication," by inventor Christian J. Hessler, the contents of which are expressly incorporated herein by this reference.

FIELD OF THE INVENTION

The present invention generally relates to a method and system for providing network security and authentication. In particular, the invention relates to multi-factor context authentication security systems and methods using a mobile electronic computing device across a network using contextual factors within a defined session.

BACKGROUND OF THE INVENTION

For decades, various computer users have generally used password-based or PIN-based authentication schemes. These methods are generally performed through a traditional user access from a fixed or mobile electronic computing device. The user generally uses a mobile electronic computing device, such as a desktop computer, laptop computer, tablet computer, mobile computer or phone, or smart phone, to access a particular resource, internal or external, such as a website, application, server, or network. In accessing the particular resource using traditional means, the user typically inputs a username and password to authenticate himself or herself and may use some additional verification method such as an out-of-band message, shared secret, physical token, certificate, or near-field communication protocol.

Traditional user access also has also been used in other areas such as the area of payment transactions. When a user desires perform a payment transaction, the user is often faced with a verification scheme where the user utilizes some level of entitlement or authorization of the payment. Although the payment arena is one area that has been quite popular for areas of entitlement or authorization, the authentication scheme is not limited to payments, as it may be used in other areas such as access towards a particular asset. In any event, the authorization process typically requires the use of any of the following: a computing device, session, website, application, server, location, and/or resource.

Unfortunately, most traditional authentication methods have various flaws and complications. For example, many conventional authentication methods are either too costly or too cumbersome to appropriately scale and be adopted ubiquitously by the marketplace. Additionally, current authentication methods and systems are not up to the security challenge modern hackers pose and the do not have the usability or privacy features that users require. Furthermore, contemporary multi-factor or two-factor solutions fail to recognize and exploit the fact that user security is a fabric, not a thread—i.e., composed of multiple variables, rather than, a single factor or variable. This ignorance of contextual realities among devices, sites, users, applications, and networks in businesses and social environments leaves most solutions woefully inadequate to meet the authentication security challenges at hand.

Although additional methods may attempt to address such issues by collapsing the acts of identification and authentication into a single process, these methods inherit the same liabilities as any other single point of failure or federated systems, regardless of the sophistication or novelty of the flow. The challenge has always been to balance advanced security with enhanced usability.

Innovatively, the authentication method that would meet the needs of current verification processes and demands would be to use multiple layers of contextual credentials or factors. Examples of such factors would include information regarding: a server or service, network, user on a fixed or mobile device, location, physical and digital proximity, relationship or association, synthesized/holistic (vs. sequential or isolated) factors, and behaviors or attributes of any or all of the above. Preferably, the ideal authentication process would be used in a high-value/low-volume session or transaction environment such as banking, healthcare data, military, or legal context. The authentication process could also be used in a low-value/high-volume space such as e-commerce, social networking, or gaming. Furthermore, the structure of the ideal and innovative authentication process should be adaptable for client-to-server, server-to-server, peer-to-peer, or hybrid architecture. The expectation of, and requirement for, privacy, usability, accuracy, simplicity, and strength is preferably equivalent in all scenarios.

The challenge, however, is to create a simple, mutual, contextual verification without depending upon or exposing the process to the traditional security solution shortcomings. Such shortcomings include, but are not limited to, issues relating to: cost, persistence, lack of privacy, interception, replay, usability, reliance upon the user skill, encryption, obfuscation, information seeding, presentation or combined submission and/or transmission of reused credentials across known or predictable channels, sequential and discrete inspection and evaluation of isolated credentials, and unilateral authoritative decision-making about the context result status. Because conventional means of authentication include the pairing of discrete and private elements of a user, device, or session with their meanings (key-value pairs), these methods inappropriately collapses the independent notions of identification (self-reported) and authentication (externally verified). As a result, private user identity information is potentially exposed for capture, replay, prediction, theft or misuse, in service of its verification.

A second challenge to create an ideal and innovative authentication method is to utilize the mobile device in a security context for what is designed for and capable of: being an interactive extension to and participant within the context of the user, site/app and session authentication. Previous incarnations of "bring your own device" or mobile device authentication methods treated the mobile computing device as simply a "capture and forward" apparatus. The device is generally used to capture, decode, and forward on credentials, keys or tokens, as opposed to participating in a manner in which it is capable. Specifically, previous inventions merely relegated the mobile device to be a camera and a hard-drive, storing obfuscated keys or cookies and forwarding them along to the back-end authoritative server for a standard password lookup and match approach. However, using a mobile device as part of the authentication scheme will strengthen the verification process by adding "augmented reality authentication"—that is, using the mobile device to interact with the fabric of the user, environment, location, proximity, behavior and context of the session in a manner that securely, privately and easily revolutionizes the traditional authentication process.

A third opportunity is to involve the user in the authentication process in a unique way that has never been accomplished with conventional authentication methods. Previous security solutions were seen as one or more layers or cumbersome steps in the end-user security flow. Users had to, for example, respond to certain password challenges or maintain custody of bespoke hardware or software credentials such as tokens, keys, certificates or select recognizable visual, audible, mathematical or textual components from a number of interfaces and prompts. The user has simply never been involved in the authentication credentials or process, but rather, has been merely responsible for responding to those components or steps at the request of the host website or application. Because a website generally holds all keys in security accessibility, user-side hacking (e.g., key-loggers, man-in the-middle, man-in-the-browser, phishing, pharming, whaling, social engineering and other such techniques) has risen and has resulted with a necessary shift away from host-server side view of authentication security to a more interactive, user-focused approach. The user should have interactive control of the depth, manner, method, makeup, and personalization of their authentication security that is stronger, contextual and more effective than previous techniques. Additionally, the ideal authentication method should also be simpler, more elegant and highly usable.

These challenges, in sum, have represented a barrier to those looking for solutions and have never been overcome by conventional methods. Given that there is no, and that there has never been a, single, successful, ubiquitous approach to interactive user authentication in the field speaks volumes to the shortcomings of conventional methods and implementations. As a result, there has been no de facto technique adopted in the field of end-user multi-factor authentication that simultaneously solves the security, usability, and interactivity challenges stated herein.

The goal or solution would be to create an authentication process, system, or method that would utilize context verification and authentication of all parties and factors while remaining immune to various authentication problems (e.g. threats, hacks, interception, replay, compromise, prediction, collusion, false results, or any of the process, method, implementation liabilities). Furthermore, the authentication process would embrace usability, achieve potential ubiquity with low-tech or no-tech integration, and elevate the mobile device to an interactive member of the authentication algorithm. This would preferably give the user additional and personal control over their security via "performed" location/behavior/custom factors, which is beyond the native security credential depth or requirements. Unlike prior art in this space which attempted to "identify" a user by their custom behavior or location, such as GPS tracking, biometric measurement, keystroke measurement, facial or voice recognition, the novel solution would achieve context authentication of these composite factors by nature of their present and influence on the decision, without inappropriately revealing or tracking the user's immutable personal identity through their literal capture, inspection, application and/or or interrogation.

There are various references that disclose authentication methods that utilize a device and network. For example, U.S. Patent Application Publication No. 2011/0219427, filed by Hito et al. (hereinafter "Hito"), and U.K. Patent Application Publication No. W2012/069845, filed by Harris (hereinafter "Harris"), disclose various authentication and encoding methods. Specifically, the Hito reference discloses techniques for simplifying an authentication process from the viewpoint of the user while employing improved security to other user who are employing weak or no security techniques.

Rather than, using the conventional username and password, the authentication method disclosed in Hito utilizes an encoded signal, which is communicated from a smart phone to an authentication server. The encoded signal informs the server whether the user has been successfully authenticated or not. While Hito discloses verification and authentication techniques that go beyond the traditional username/password scheme, Hito fails to utilize contextual factors in a defined user session (e.g., behavioral factors, location factors, custom factors) that would aid in strengthen the verification process.

Regarding U.K. Patent Application Publication No. W2012/069845 filed by Harris, the Harris reference discloses an authentication method that utilizes a portable device, a first server, and a second server. The portable device obtains encoded information and decodes the information. After decoding the information, the portable device transmits a message to the first server; wherein the first server includes decoded information and a first identifier, which identifies the device or user. The first server receives the message and establishes the identity of the user or device. As a result, the first server performs an action based upon the decoded information. The Harris reference also may use other various authentication factors such as possession of the device and knowledge of a password. However, like the Hito reference, Harris fails to utilize contextual factors based upon a defined user session that would strengthen the verification process.

Both instances of the references cited above rely upon the common approach of seeding the credentials within the session messages, transmitting them as key-value pairs in a unidirectional manner to be verified by a single authoritative source that establishes that authenticity by server storage, retrieval and matching of the literal factors. In addition, the server authority must capture, store and reference literal shared and reused knowledge about the user, site, device and session identifiers during comparison, which can be used, out of context, to reconstruct or replay an actual, valid authentication session. The custody and secrecy of these static identifiers during capture, storage or transmission is the key to the efficacy of prior art, regardless of the novelty of presentation or transmission. It is this inability to innovate beyond this convention that supports the majority of breaches, hacks and failures that plague current authentication methods, including these, in practice at present. Without achieving a dynamic, context-aware treatment of non-identifying authentication factors mutually asserted in a triangulated (versus unidirectional) framework, there can be no innovation beyond convention nor a viable inventive solution to the failures of prior art.

In addition to the two references listed above, many relevant references exist within the field of the present invention. However, these references also tend to fall into a definable set of inadequate approaches, dating back to antiquated security notions from the early to mid-20th century. The advent of mobile technology has unleashed a series of new art and references that utilize the mobile sensing, processing, and transmission capabilities of the mobile computing devices. Unfortunately, these references embody the multi-purpose capabilities within stale authentication paradigms, models of shared-secret, security by obscurity and flat, non-context-aware, unidirectional processing, regardless of their out-of-band (OOB) characteristics or flow.

These relevant references have relied upon four primary modes of authentication above username/password or single-sign-on (SSO): (1) seed and read (store credential on device and reference upon subsequent authentication); (2) scratch and match (script-based dynamic browser/device recognition, cookies); (3) ring and ping (out-of-band, one-time passwords or tokens, shared secrets, PINs); and (4) decode and forward (QR-code based model to capture code, match with seeded credential and forward to back-end server for lookup and match)

Specifically, the shortcomings of the references listed above fall under these areas: (1) cumbersome usability for the end-user; (2) user enrollment process that exposes weakest initial trust link; (3) lack of credential integrity through multi-perspective assertions; (4) lack of awareness of credential, user or device location, proximity, history, or movement; (5) decreased user privacy through repeat, paired transmission of static identifiers; (6) lack of credential flexibility or diversity; (7) failure to achieve ubiquity across devices, session types; (8) improper flow of credentials (from secure channel to insecure); (9) unilateral assertion authority (single lookup/match process); (10) lack of credential context awareness (time, location, behavior); (11) lack of user control over credential depth, composition and process; (12) over-identification of the user or device during authentication; (13) unnecessary transmission of user or device identifying data key value pairs; (14) heavyweight components such as PM (public/private key encryption), digital certificates and permanent keys that require distribution, obfuscation and revocation management on the mobile device; (15) single directional flow of key-value credentials towards an single authoritative target; (16) single perspective or measurement of the context credentials; and (17) non-interactive relegation of the smart device to a simple decode and forward utility.

Various embodiments disclosed previously have failed to adequately resolve the present security needs, as evidenced by the ongoing security attacks successfully conducted by hackers and criminals. In addition, the solutions proposed by current security solutions fail to solve the following problems, namely: (a) authentication is traditionally shared secret, static, and subject to interception, replay or prediction based on persistent information only obfuscated by encryption or session flavoring; (b) authentication security is expensive, cumbersome, difficult for users to understand or use; (c) authentication relies on obfuscation, encryption, user skill/custody or secrecy to be effective; (d) credentials are usually fixed, sequential and single-mass in depth, intelligence and context; (e) security information flows backwards, over primary, predictive or known channels such as the browser, together as key-value pairs, towards the unilateral authority in the process; (f) the authentication decision relies upon a unilateral observation, interrogation, lookup-match or single authoritative assertion of credentials, usually in a client-server patriarchal relationship between the identifier and the one being identified. Mutual authentication is an afterthought; (g) secret security information is often delivered over secure out-of-band (OOB) channels, only to have the user or device re-insert that yet unverified secret back over the primary, unsecured channel (e.g., browser); (h) user assumes all risk/responsibility, but has no control over enhancing, modifying, or improving their security over and above what the issuing/authoritative source requires or allows; (i) security requires re-identification or the user or device along with authentication, mixing credentials in the channel; (j) authentication security is risky when engaged with a mobile device whose integrity is unknown; (k) to date, there has been no ubiquitous invention to layer defense-in-depth authentication on top of single-sign-on top of username/password, single-sign-on (SSO) or identity management approach; (l) security which relies on location is only measuring the digital interpretation of that locale, failing to triangulate the physical (line of sight, line of sound, line of sensation) with digital; (m) true defense-in-depth, a layer of proper authentication of a different species than the initiating self-reported identification, is often ignored in lieu of simply additional passwords or secrets, or the assumption that identity by reference (i.e. SSO) is adequate for the category of authentication; and (n) template-based approaches have simply been static containers for traditional literal factor gathering and unidirectional transmission back to a single, authoritative data store for isolated, non-contextual comparison.

Specifically, solutions proposed in the references list above using encoded Quick Response (QR) images and mobile device scanning to identify or authenticate a user or device, such as the Hito reference and the like, are insufficient due to the following limitations and inferior methods: (a) reliance upon heavily encoded, encrypted, or obfuscated content within the image or QR code itself such as webserver, user, device, identity or session information—and the integrity and secrecy of that object and its transmission being essential for its effectiveness to authenticate; (b) reliance upon expensive, static, seeded, embedded credentials on the mobile device (such as a digital certificate or public/private key pair) that must be managed to provide the user/device identifiers as opposed to performing a real-time, dynamic, purpose-built, interactive assertion of those identities and contexts; (c) reliance on a separate set of those credentials above (b) being deployed, seeded, managed and associated for each of a user's multiple mobile devices; (d) unidirectional flow of object presentation to scan to transmit towards the authoritative service on the back-end, assumes either complete encrypted integrity of the process or complete decomposition isolation, and inspection of the credentials by the authority against a stored database of literal data; (e) the former approach (in (d)) eliminates the mobile computing device role or value in the process, as imply a catch and forward mechanism without context awareness or mutual decision making; (f) the latter approach (in (d)) burdens the authority for making the unilateral authentication decision in isolation with literal credentials, opening path for reverse engineering, replay or prediction; (g) the store-and-forward approach denies the process interaction and richer, smarter awareness of multiple factors in depth within the fabric of the session context; (h) the reliance on the host server (presentation layer) to interact with the encoded content provide opportunity for inspection, hack, replay, capture, modification, compromise; (i) the reliance on encryption requires equal and opposite decryption and/or re-encryption capabilities of the mobile computing device, thus spreading the logic of the process remotely and exposure to hack; (j) the risk of collapsing and co-mingling of identity and authentication data as the process sends identifiers along the same wire through the code, mobile and messaging to the authoritative server provides numerous opportunities for attack, questionable integrity and lack of privacy; (k) in service of excessive usability in collapsing the login scan (self-reported) with the authentication test (static stored phone credential), the limitation of the overall process for the sole purpose of granting or denying a user access to a resource without relation to additional identity or authentication methods (i.e., no longer a defense-in-depth layer) results in the prior art being a single point of failure; (l) lack of proper triangulation, interrogation, measurement and interdependent decision making with respect to the source, integrity and status of the authentication context; (m) failure to treat authentication as a context, simply a set of credentials to be forwarded; (n) failure to triangulate physical and digital assumptions on location, proximity and behavior, from multiple sources and perspectives; and (o) failure to actively involve and engage the user, device, session context, location, proximity, behavior and triangulation context in the authentication process.

Thus, based on the foregoing, what is needed is an authentication method and system that overcomes the deficiencies in the systems currently available. The present invention solves these deficiencies and generally represents a new and useful innovation in the space of contextual factor authentication across authentication networks.

SUMMARY OF THE INVENTION

To minimize the limitations in the prior art, and to minimize other limitations that will become apparent upon reading and understanding the present specification, the present invention discloses a new and useful mobile security context authentication system and method.

One embodiment of the present invention is a computer-based method for authenticating a user across a network, the steps comprising: providing a host, a server, a presentation, and a device; wherein the device includes one or more applications; wherein the server includes a profile algorithm; requesting an access to the host by a main user at the presentation over a user channel; requesting the server to perform a context verification decision by the host over a host channel; creating two or more template objects by the profile algorithm of the server; wherein the two or more template objects are a first template and a second template; sending an object to the host over the host channel by the server; presenting the object to the device at the presentation and over the user channel by the host; processing the first template by the server; wherein the processing step of the first template is based upon one or more contextual factors; populating the first template by the server; creating and storing a first signature (in memory) by the server; wherein the creating step of the first signature is based upon the processing step of the first template; consuming the object by the main user on the device through the one or more applications; requesting the second template of the server over a preferably encrypted smart channel by the one or more applications; sending the second template to the one or more applications on the device over the smart channel by the server; processing the second template by the one or more applications; populating the second template by the one or more applications; creating and storing a second signature (in memory) by the one or more applications; wherein the creating step of the second signature is based upon the second template; and performing the context verification decision when comparing the first signature and the second signature over the smart channel. The computer-based method may further comprise the step of providing one or more additional external factors to the device by the host over the out-of-band channel. The computer-based method may further comprise the step of: deleting the one or more contextual factors by the server. The processing step of the second template may be performed based upon one or more contextual factors. The creating and storing step of the first signature may be based upon the consuming step of the object. The creating and storing step of the first signature may be based upon the processing step of the second template. The computer-based method may further comprise the steps of: inputting one or more out-of-band data into the one or more applications; wherein the one or more out-of-band data is transmitted over the out-of-band channel. The comparing step of the first signature and the second signature may be performed by the server. The comparing step of the first signature and the second signature may be performed by the one or more applications. The computer-based method may further comprise the steps of: authenticating the device when the first signature is essentially identical to the second signature.

Another embodiment of the present invention is a computer-based method for authenticating a user across a network, the steps comprising: providing a host, a server, a presentation, and a device; wherein the device includes one or more applications; wherein the server includes a profile algorithm; requesting an access to the host by a main user at the presentation over a user channel; requesting the server to perform a context verification decision by the host over a host channel; creating a first template and a second template by the profile algorithm of the server; sending an object to the host over the host channel by the server; presenting the object to the device at the presentation and over the user channel by the host; processing the first template by the server; wherein the processing step of the first template is based upon a first set of one or more contextual factors; populating the first template by the server; creating and storing a first signature (in memory) by the server; wherein the creating step of the first signature is based upon the processing step of the first template; consuming the object by the main user on the device through the one or more applications; requesting the second template of the server over a preferably encrypted smart channel by the one or more applications; sending the second template to the one or more applications on the device over the smart channel by the server; processing the second template by the one or more applications; populating the second template by the one or more applications; creating and storing a second signature (in memory) by the one or more applications; wherein the creating step of the second signature is based upon the second template; performing the context verification decision when comparing the first signature and the second signature over the smart channel; and authenticating the device when the first signature is essentially identical to the second signature. The computer-based method may further comprise the steps of: providing one or more additional external factors to the device by the host over the out-of-band channel. The computer-based method may further comprise the steps of: deleting the one or more contextual factors by the server. The processing step of the second template may be performed based upon a second set of one or more contextual factors. The creating and storing step of the first signature may be based upon the consuming step of the object. The creating and storing step of the first signature may be based upon the processing step of the second template. The computer-based method may further comprise the steps of: inputting one or more out-of-band data into the one or more applications; wherein the one or more out-of-band data is transmitted over the out-of-band channel. The comparing step of the first signature and the second signature may be performed by the server. The comparing step of the first signature and the second signature may be performed by the one or more applications.

Another embodiment of the present invention is a computer-based method for authenticating a user across a network, the steps comprising: providing a host, a server, a presentation, and a device; wherein the device includes one or more applications; wherein the server includes a profile algorithm; requesting an access to the host by a main user at the presentation over a user channel; requesting the server to perform a context verification decision by the host over a host channel; creating a first template and a second template by the profile algorithm of the server; sending an object to the host over the host channel by the server; presenting the object to the device at the presentation and over the user channel by the host; processing the first template by the server; wherein the processing step of the first template is based upon one or more contextual factors; populating the first template by the server; creating and storing a first signature (in memory) by the server; wherein the creating step of the first signature is based upon the processing step of the first template; wherein the creating and storing step of the first signature is based upon the consuming step of the object; consuming the object by the main user on the device through the one or more applications; requesting the second template of the server over a smart channel by the one or more applications; sending the second template to the one or more applications on the device over the smart channel by the server; processing the second template by the one or more applications; wherein the processing step of the second template is based upon of one or more contextual factors; populating the second template by the one or more applications; creating and storing a second signature (in memory) by the one or more applications; deleting the one or more contextual factors by the server; wherein the creating step of the second signature is based upon the second template; performing the context verification decision when comparing the first signature and the second signature over the smart channel by the server and the one or more applications; and authenticating the device when the first signature is essentially identical to the second signature.

Another embodiment of the invention is illustrated where a user wishes to log into a website or application. Generally, the user wishes to access a host or website over a user channel from his or her computer or other type of electronic data processing unit device over a browser and logs in using a traditional username/password, combination thereof, and/or single-sign-on identification step. The website then preferably contacts the server across a host channel such as a private communication channel with a request to authenticate. In response, the server preferably returns an object, such as a QR code, textual code, or hyperlink to present the user. The server also preferably creates two or more templates in its memory (a first template for its own processing and a second template for the consumption by the device or electronic data processing unit of the user. Additionally, the website generally presents an object or link object back to the user over a presentation such as a browser channel. While using an application on his or her device, the user selects the object by scanning, sensing, entering, inputting, or responding to the object or link object. As a result, the application preferably follows the object to retrieve the second template directly, privately, and independently from the server over a smart channel, which is preferably a new, encrypted, discrete third channel, separate from the user channel and host channel. The server then preferably populates the first template with contextual factors such as elements of the session context (e.g., host server, link/code object presentation location, user, device, location, any supplied credentials or cloud-stored algorithms about the user behavior, attributes or history). Using such contextual factors from the perspective of the server, the server preferably, algorithmically populates the first template to construct a first signature—i.e., a one-time context signature in memory. Simultaneously or approximately the same time, the application on the device of the user preferably, randomly populates similar contextual factors from the perspective of the device using elements of the website, server, device itself, user, and session. This step preferably results with the device of the user to independently populate the second template to algorithmically construct a second signature. The second signature may potentially correlate or conflict with the first signature of the server. Furthermore, the user may "perform" certain behavioral actions (e.g., facing north, orienting the mobile in portrait mode or executing a gesture, or "exist" within certain location or proximity attributes such as nearness to the server display screen or another device or fixed location point), which are also preferably interrogated in real-time and further strengthen the second signature of the user. Any data from expected performance, location, proximity, or other contextual factors from a previous user or device, may create complementary modification of the algorithm on the server. Regardless of number, composition and depth of inputs (i.e., a multi-mass signature), the templates and signatures are preferably unique and distinct from each other and any other previous or future objects. Preferably, the first and second signatures are not reused or replayed, but rather, modified by new inputs, attributes, and contextual factors. Upon completion creating the first and second signatures, the server and device preferably compare their respective signatures over the smart channel, bypassing the user channel (e.g., browser) and host channel. If the first signature and second signature match, the entire context is preferably mutually authenticated. On the other hand, if the first signature and second signature fail to match, the mutual context is preferably not authenticated. Preferably, no information or key-value pairs are captured or transmitted, but rather, algorithmically applied once at the server end and user end. The server preferably informs the user, device, and the host the authentication status, and the parties may proceed appropriately based upon the results of the authentication. All session components are preferably destroyed in memory, and no information is preferably stored, written, read, retrieved or seeded to or from the device during any part of the authentication process.

The present invention provides a new method and system for providing network security, as the authentication requires separation, triangulation, contextual interrogation and equitable and mutual decision making in a space traditionally constrained by obfuscation, shared-secrecy and authoritative administration and assertion of credentials and verification. By facing a new arena of the World-Wide Web, cloud computing, mobile computing, and social interaction, the present invention has addressed the evolution from maintaining a custody of authentication credentials, (which parties (or peers) are seen as requiring, assessing or establishing trust) to contextual based authentication where the context of authentication provide greater security and authentication. The present invention goes beyond the traditional remote or client-server access.

The present invention preferably discards the conventional shared-secret or capture-and-forward authentication methods in order to create a new, more intelligent and future-proofed mechanism for network security that embraces the realities of connections, credentials, authorities, behaviors, networks, mobility, peers and augmented-reality contexts in the social, mobile digital age.

It is an object of the present invention to provide a mobile security context authentication system and method that preferably achieves a strong, elegant, private, definitive and real-time verification and authentication in the context of a user, device, site/session, server, location and behavioral attributes within a defined session and across a network from a mobile electronic computing device. The invention preferably achieves this goal and presents true authentication innovation by employing the following three new components: (1) synthesized, real-time, non-identifying, multi-factor mutual context credential verification from multiple perspectives beyond a primary session channel; (2) mobile line of sight/sound/sense triangulation of digital and physical location and proximity; and (3) user-driven, additive authentication security enhancement, with verification and control via personalization and/or 'gamification' factors such as location, proximity, behavior or customization through in-application purchase or enablement, configuration and performance.

It is another object of the present invention to provide mobile security context authentication system and method that utilizes synthesized, multi-mass, purpose-built authentication signatures of multiple context factors as opposed to inspecting them individually and transmitting as key-value pairs.

It is another object of the present invention to provide a mobile security context authentication system and method that utilizes an algorithmic, template-based contextual fabric verification and authentication.

It is another object of the present invention to provide a mobile security context authentication system and method that utilizes a non-unilaterally authoritative matching process and decision across all members, channels equally, rather than, a single patriarchal source of authority or secret.

It is another object of the present invention to provide a mobile security context authentication system and method that does not rely upon cookies, certificates, seeded or persistent information, public/private keys, shared secrets, passwords, user knowledge or biometric factors at the host, invention server or user/device layers.

It is another object of the present invention to provide a mobile security context authentication system and method that utilizes triangulated, separated, bi-directional data communication channel flows among parties thus eliminating a single point of failure, interception or route.

It is another object of the present invention to provide a mobile security context authentication system and method that utilizes multi-perspective inspection and interrogation of contextual factors.

It is another object of the present invention to provide a mobile security context authentication system and method that does not rely on encoded, encrypted or embedded secrets, identifying information within the link or launch object, code, image, sound/signal or vibration (e.g., QR code).

It is another object of the present invention to provide a mobile security context authentication system and method that utilizes automatic, real-time algorithmic processing on a server and mobile device; without storing, seeding, managing and transmitting discrete data or credentials.

It is another object of the present invention to provide a mobile a security context authentication system and method that utilizes dynamic enrollment and authentication across all mobile devices of users as opposed to device-by-device credential seeding, matching and association.

It is another object of the present invention to provide a mobile a security context authentication system and method that utilizes private, non-identifying authentication of users, devices, sites, sessions, factors.

It is another object of the present invention to provide a mobile a security context authentication system and method that utilizes physical line-of-sight/sound/sensation context verification of digital assumptions.

It is another object of the present invention to provide a mobile a security context authentication system and method that utilizes technology, protocol, and/or platform agnostic implementation across multiple devices.

It is another object of the present invention to provide a mobile a security context authentication system and method that utilizes a user-controlled authentication personalization factors such as: behavior, context, location, via in-app options and configuration.

It is an object of the present invention to provide a new, novel system and method that offers a superior solution in the field, science, and area of electronic authentication.

It is an object of the present invention to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 1 is a lexicon table showing a collection of alphanumeric characters that helps explain, in conjunction with the present disclosure, one or more symbols in the following figures.

DETAILED DESCRIPTION OF THE INVENTION

Figure 2:
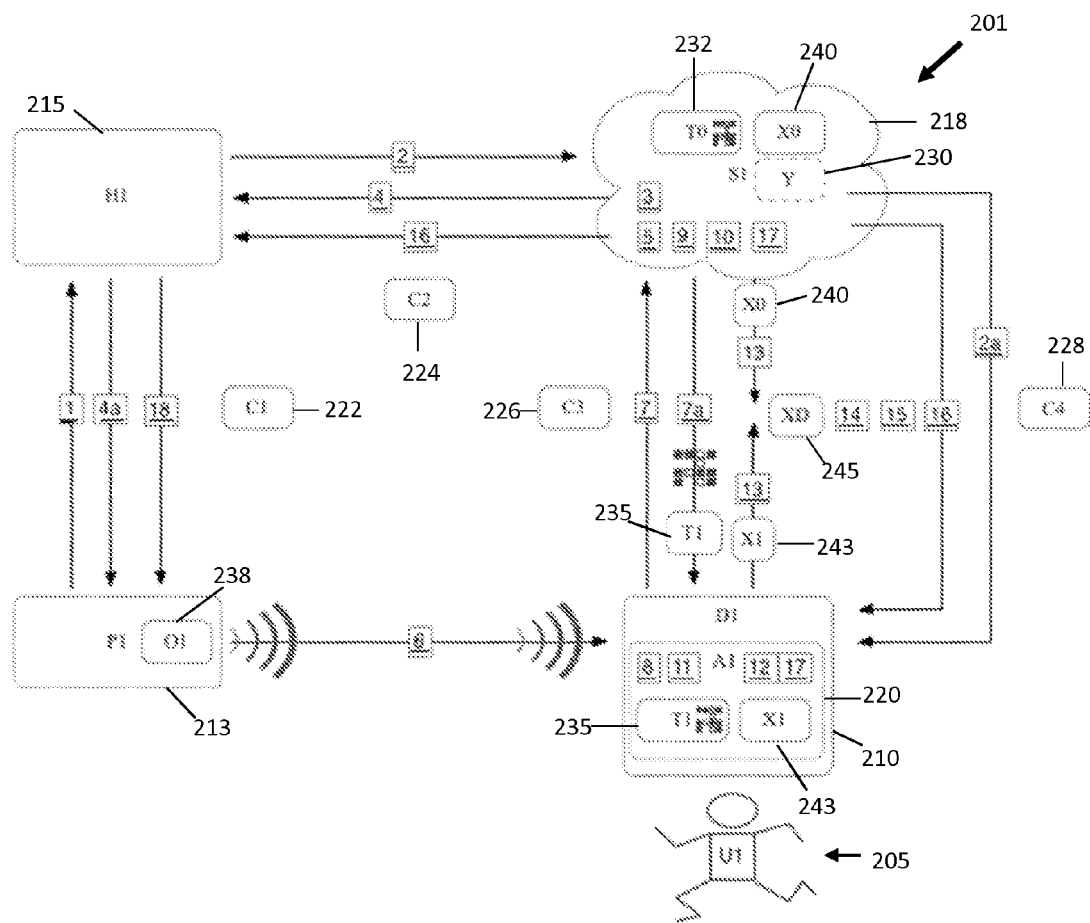
FIG. 2 is a functional flow-block diagram of one embodiment of the mobile security context authentication system and method and shows the functions and steps among a host, server, main user, device, application, and presentation from the presentation to the device.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the graphs, figures, and the detailed descriptions thereof, are to be regarded as illustrative in nature and not restrictive. Also, the reference or non-reference to a particular embodiment of the invention shall not be interpreted to limit the scope of the invention.

In the following description, certain terminology is used to describe certain features of one or more embodiments of the invention. For instance, the terms "device", "computer", "electronic data processing unit", "invention server", or "server" refers to any device that processes information with an integrated circuit chip, including without limitation, personal computers, mainframe computers, workstations, servers, desktop computers, portable computers, laptop computers, embedded computers, wireless devices including cellular phones, personal digital assistants, tablets, tablet computers, smart phones, portable game players, and hand-held computers. The term "internet" refers to any collection of networks that utilizes standard protocols, whether Ethernet, Token ring, Wifi, asynchronous transfer mode (ATM), Fiber Distributed Data Interface (FDDI), code division multiple access (CDMA), global systems for mobile communications (GSM), long term evolution (LTE), or any combination thereof. The term "website" refers to any document written in a mark-up language including, but not limited to, hypertext mark-up language (HTML) or virtual reality modeling language (VRML), dynamic HTML, extended mark-up language (XML), wireless markup language (WML), or any other computer languages related thereto, as well as to any collection of such documents reachable through one specific Internet Protocol Address or at one specific World Wide Web site, or any document obtainable through any particular Uniform Resource Locator (URL). Furthermore, the terms "webpage", "page", "website", or "site" refers to any of the various documents and resources on the World Wide Web, in HTML/XHTML format with hypertext links to enable navigation from one page or section to another, or similar such resources used on the Internet.

The term "factor" refers to any factors, including multi-mass factors, during the main authentication session, including without limitation, personalized authentication context factors or personal factors (e.g., location factors, behavioral factors, custom factors, proximity factors); elements or factors of the session context in the perspective of the server (e.g., host server, link/code object presentation location, user, device, location, any supplied credentials or cloud-stored algorithms about the user behavior, attributes or history); elements of the session context in the perspective of the device (e.g., elements of the website, server, device itself, user, and session); behavioral actions of the user (e.g., facing north, orienting the mobile in portrait mode or executing a gesture, or "exist" within certain location or proximity attributes such as nearness to the server display screen or another device or fixed location point); and external factors such as one or more of an out-of-band personal identification numbers (PIN), passphrase, shared secret data, one-time-password or reused password, delivered via email, short message service (SMS), multimedia service (MMS), voice, physical token, or other human or computer mediated transmission outside of the user channel, host channel, and smart channel.

The present invention is preferably a multi-factor context authentication security method and system that uses one or more electronic computing devices across a network and one or more contextual factors within a defined session. One embodiment of the invention occurs when a user wishes to log into a website or application. The user may access a host or website over a user channel from his or her computer or other type of electronic data processing unit device through a browser and preferably logs in using a traditional username/password, combination thereof, and/or single-sign-on identification step. The website then preferably contacts the server across a host channel such as a private communication channel with a request to authenticate. In response, the server preferably returns an object, such as a QR code, textual code, or hyperlink to present the user. The server also preferably creates two or more templates in its memory (a first template for its own processing and a second template for the consumption by the device or electronic data processing unit of the user). Additionally, the website generally presents an object or link object back to the user over a presentation such as a browser channel. While using an application on his or her device, the user selects or consumes the object by scanning, sensing, entering, inputting, or responding to the object. As a result, the application preferably follows the object to retrieve the second template directly, privately, and independently from the server over a smart channel, which is preferably a new discrete third channel, separate from the user channel and host channel. The server then preferably populates the first template with contextual factors such as elements of the session context (e.g., host server, link/code object presentation location, user, device, location, any supplied credentials or cloud-stored algorithms about the user behavior, attributes or history). Using such contextual factors from the perspective of the server, the server preferably, algorithmically populates the first template to construct a first signature—i.e., a one-time context signature in memory. Simultaneously or approximately near the same time, the application on the device of the user preferably, randomly populates similar contextual factors from the perspective of the device using elements of the website, server, device itself, user, and session. This step preferably results with the device of the user to independently populate the second template to algorithmically construct a second signature. The second signature may potentially correlate or conflict with the first signature of the server. Furthermore, the user may "perform" certain behavioral actions (e.g., facing north, orienting the mobile in portrait mode or executing a gesture, or "exist" within certain location or proximity attributes such as nearness to the server display screen or another device or fixed location point), which are also preferably interrogated in real-time and further strengthen the second signature of the user. Any data from expected performance, location, proximity, or other contextual factors from a previous user or device, may create complementary modification of the algorithm on the server. Regardless of number, composition and depth of inputs (i.e., a multi-mass signature), the templates and signatures are preferably unique and distinct from each other and any other previous or future objects. Preferably, the first and second signatures are not reused or replayed, but rather, modified by new inputs, attributes, and contextual factors. Upon completion creating the first and second signatures, the server and device preferably compare their respective signatures over the smart channel, bypassing the user channel (e.g., browser) and host channel. If the first signature and second signature match, the entire context is preferably mutually authenticated. On the other hand, if the first signature and second signature fail to match, the mutual context is preferably not authenticated. Generally, no information or key-value pairs are captured or transmitted, but rather, algorithmically applied once at the server end and user end. The server preferably informs the user, device, and the host the authentication status and, as a result, the parties may proceed appropriately, depending upon the results of the authentication. All session components are preferably destroyed in memory, and no information is preferably stored, written, read, retrieved or seeded to or from the device during any part of the authentication process.

FIG. 1 is a lexicon table showing a collection of alphanumeric characters that helps explain, in conjunction with the present disclosure, one or more symbols in the following figures. For example, the symbol "U1" preferably refers to the main user. Additionally, the symbol "H1" generally refers to the host or main host. While multiple symbols are disclosed to represent and explain various embodiments of the present invention, the invention is capable of modifications in various obvious aspects, as the symbols are to be regarded as illustrative in nature and not restrictive.

Part 1—Authentication

FIG. 2 is a functional flow-block diagram of one embodiment of the mobile security context authentication system and method and shows the functions and steps among a host, server, main user, device, application, and presentation from the presentation to the device. As shown in FIG. 2, one embodiment of the mobile security context authentication system and method 201 preferably includes: a main user 205; device 210; presentation 213; host 215; server 218; application 220; user channel 222; host channel 224; smart channel 226; out-of-band channel 228; profile algorithm 230; first template 232; second template 235; object 238; first signature 240; and second signature 243. Furthermore, the steps 1, 2, 3, 4, 4a, 5, 6, 7, 7a, 8, 9, 10, 11, 12, 13, 14, 15, 16, 17, 18 of one embodiment of the mobile security context authentication system and method 201 are preferably referenced by numerals in the figures.

The main user 205 is generally any individual who wishes to authenticate a communication session with the host 215 and server 218 by using a real-time, mutual, triangulated, multi-factor authentication on a device 210, using application 220 from display or presentation 213 to device 210. The device 210 is typically an electronic data processing unit that performs various functions through its application 220 such as scanning and sensing and is preferably network capable. Presentation 213 is in the present embodiment is preferably a unidirectional display or emitter for the scanning, clicking, entry, sensing, consumption or processing and decoding by the main user 205 on the device 210 via the application 220. Preferably, the scanning to transmit towards the authoritative service at the back-end includes a complete encrypted integrity of the process or complete decomposition isolation, and inspection of the credentials by the authority against a stored database of literal data. The host 215 is typically any independent computer, mobile computing device, electronic data processing unit, server, application, or website that is connected to a network, which may provide information resources, services, and application to users or other nodes on the network. The server 218 is preferably any computer, computer program, or electronic data processing unit that assists in managing access to a centralized resource or service in a network. The application 220 is preferably one or more pieces of computer software that causes the device 210, computer, or electronic data processing unit to perform any useful task beyond the running of the computer itself.

The user channel, 222, host channel 224, smart channel 226, and out-of-band channel 228 are preferably separate channels of communications within a network, independent from each other. Specifically, the user channel is preferably a specified frequency band for the transmission and reception of electromagnetic signals between presentation 213 and host 215. The host channel 224 is preferably a specified frequency band for the transmission and reception of electromagnetic signals between host 215 and server 218. The smart channel 226 is preferably a specified frequency band for the transmission and reception of electromagnetic signals between server 218 and device 210. The out-of-band channel 228 is preferably one or more specified frequency bands outside the smart channel 226 for the transmission and reception of electromagnetic signals between server 218 and device 210 for authentication purposes.

The profile algorithm 230 is preferably the persistent element, function, or object of the server 218 for processing and preferably represents a unique context of a user, device, site, session, behavior, location, proximity and custom factors. Generally, each context has a unique algorithm stored in the server 218 or server cloud either generated at first registration or referred to upon subsequent authentication for template generation and resultant processing.

The first template 232 and second template 235 are preferably any files, file type, or combination of coding elements that are disposable, purpose-built, surrogate, context-specific and dynamic in mass (size, sequence, format, structure, depth and quantity of registers) whose composition and population algorithm is defined by the context and member processing.

Object 238 or link object is preferably any link element that is general placed inside a file or script for the consumption by the main user on application 220 of the device 210 through scanning, sensing, clicking, or manually entering the object into the application 220; programmatically with the application 220; or from the presentation 213 to the device 210 over the host channel 224.

The first signature 240 and second signature 243 are preferably any elements in the file or file itself used to authenticate each server, client station, mobile computing device, or electronic data processing unit during the authentication session.

Referring to FIG. 2, the first step 1 of the mobile security context authentication system and method 200 generally occurs when main user 205 requests access to a resource host 215 such as a host 215. Specifically, the main user 205 preferably requests access to a resource and may perform an action over a network, requiring entitlement or authentication on server 218 or host server at presentation 213 over the user channel 222 from the device 210 of the main user 205 in a fixed session or context. The fixed session or context may occur within, between, or among a browser, an application, a program, a network, a server, or a fixed electronic data processing unit or mobile electronic data processing unit.

FIG. 2 also shows the second step 2, which is preferably performed when host 215 requests the server 218 over host channel 224 to perform an authentication or context verification decision regarding the context of the main user 205/device 210/host 215 within a main or defined session over smart channel 226. This requires is typically based on either a sole event or a decision layer upon existing identity or other authentication process. The context verification decision 245 is generally a channel-triangulated, real-time, multi-authoritative, multi-mass context verification of based upon the contextual factors across the host 215, device 210/main user 205, or multiple hosts and multiple devices/users, across multiple channels, and perspectives of the server 218 and device 210. The context verification decision 245 is preferably designed to authenticate and verify holistic context authenticity, rather than the identity of isolated members or factors of host 215, main user 205, device 210, or server 218 in the traditional, conventional authentication framework.

FIG. 2 also shows the optional second step 2a, which may be performed when host 215 provides additional external factors (relating to the main user 205 or device 210) to the device. The additionally external factors may be delivered via an out-of-band channel 228 to the main user 205 or device 210, for later use. Additional external factors may include, but are not limited to: one or more of an out-of-band personal identification numbers (PIN), passphrase, shared secret data, one-time-password or reused password, delivered via email, short message service (SMS), multimedia service (MMS), voice, physical token, or other human or computer mediated transmission outside of the user channel 222, host channel 224, and smart channel 226.

In response, as shown in FIG. 2 in the third step 3, the server 218 preferably constructs (to the request from host 215 over host channel 224) two or more template objects based on the synthesis of the main session factors, generated profile algorithm 230, and/or random values. The template objects (e.g., first template 232 and second template 235) are preferably different, purpose-built, disposable, and universally unique data elements stores in the memory of the server 218. The two or more template objects are preferably constructed and processed by the profile algorithm 230, which is typically either a generated object (first time user authentication) or a cloud-stored object. As discussed above, the two or more template objects are preferably a first template 232 and second template 235; wherein the first template 232 is preferably generated fully from profile algorithm 230 for server 218 self-consumption and processing, while second template 235 is only a partially generated for transmission, consumption, population and processing by main user 205 or device 210. Preferably, neither the first template 232 nor second template 235 contains nor reveals any relationship to profile algorithm 230, the user/device identification number, the host 215, and the session details. The first template 232 and second template 235 are preferably and merely universally unique, partial containers to be independently and algorithmically populated and processed in real-time during the invention authentication process.

Regarding the fourth step 4, the server 232 preferably returns to host 215 an object 238 or link object over the host channel 224 (rather than, the actual or even surrogate object values). The object 238 preferably provides a reference to link the main user 205 to the target object second template 235, as shown in FIG. 2.

Additionally, in the fourth step 4a shown in FIG. 2, host 215 preferably presents, displays, or emits that an object 238 to main user 205/device 210 at presentation 213 over user channel 222 for scanning, clicking, entry, sensing, consumption or processing and decoding by main user 205 on device 210 via the application 220. Due to session environmental opportunities or constraints, the path or link to the second template 235 may be embodied by object 238 for consumption by the device 210/main user 205, in any of, but not limited to, the following formats: a visual or audible code (QR code, image, tag, string, hyperlink, image, sound) scanned or sensed by a capable mobile device, manual code (email, Tweet, direct message (DM), short message service (SMS), multimedia messaging service (MMS), hyperlink, remote procedural call (RPC)) typed in by a user, programmatic code (in-memory message, application programming interface (API), function or method call in application to application (as shown in FIG. 2) or other transmission (near field communication (NFC), device/environmental vibration, device bump or motion, contextual message, gesture, behavior, challenge/response, "gamified" user activity at the presentation 213 or device 210 of skill or chance).

Figure 6:
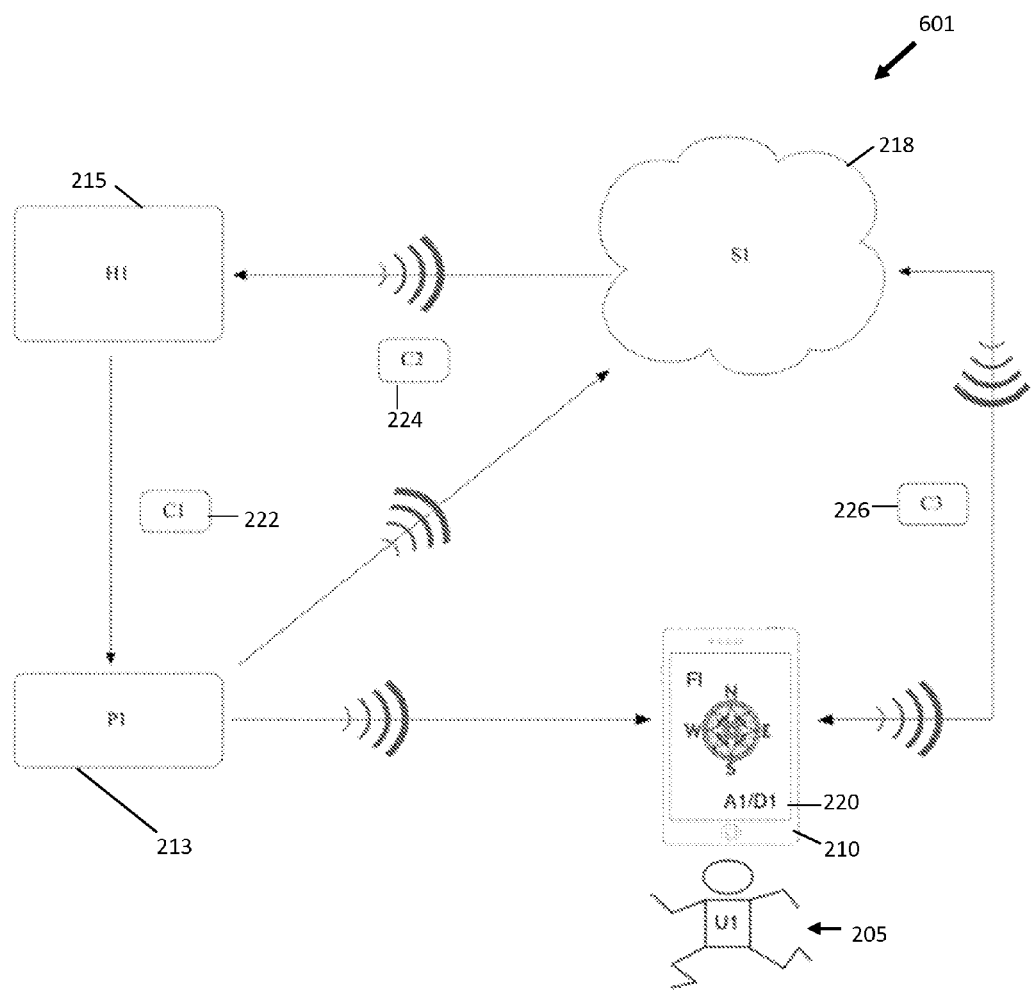
FIG. 6 is a functional flow-block diagram of one embodiment of the mobile security context authentication system and method and shows the triangulation among the host, presentation, device, and server.

In memory, server 218 preferably dynamically interrogates, measures and populates its specific profile algorithm-generated first template 232 with any contextual factor observations from the present session of one or more information or attributes regarding: the session, host 215, presentation 213, device 210, main user 205, host location, presentation location, device location, user location, user channel, any transmitted external factors, and either it is stored, or host 215 provided, knowledge of device factors, and personalization factors (e.g., behavior, location, proximity, custom) for main user 205. In particular, server 218 preferably measures, triangulates and computes the physical and digital location/proximity (user location, device location, presentation location, host location) of presentation 213/object 238 and device 210, from its perspective, via measuring both object 238/presentation 213 and device 210 (as shown in FIG. 6). Server 218 then preferably computes and stores in memory a dynamic, purpose-built signature algorithm first signature 240 based on the first template 232/main session. Server 218 then preferably disposes all data relating to the multi-mass factor (as shown in FIG. 2, fifth step 5).

The object 238 is preferably consumed by the main user 205 on device 210 through scanning, sensing, clicking or manually entering the object 238 either into application 220; programmatically with application (application-to-application rollover, within device); or from presentation 213 to device 210 (presentation to device) over host channel 224, as shown in FIG. 2, sixth step 6.

Application 220 on the device 210 preferably and dynamically follows object 238 path over triangulated smart channel 226 back to server 218 to request, receive and consume the new, actual second template 235 back over smart channel 226. Consumption of the second template 235 is preferably not constrained or limited to the aforementioned method used to transmit and/or consume the object 238 itself. Alternate triangulated channels may also be used without deviating from the scope of the invention, as shown in FIG. 2, seventh step 7. The method of authentication process initiation of the present invention is typically drastically different from the traditional capture, decode and forward approach of most QR-code based techniques found in conventional methods, and represents a leap forward in strength, privacy and integrity as the code/value of the object 238 transmitted presentation and consumed application on the device 210 is disposable and not private or identifying. In addition, the launch point generally represents the final responsibility of the host 215 and presentation 213, unlike conventional methods, which must embed host or session info within the code for consumption, association with static mobile or user credentials, and eventual paired transmission back to an authenticating server. In the present invention, the obfuscation or hiding of the coded data is generally not seminal to its security or functionality, but merely a path to a more private and controlled session connection for consumption of the authentication session object, and therefore a more robust, secure and novel approach.

Next, application 220 on the device 210 preferably consumes the second template 235 and interrogates itself and the context in real-time, from the perspective of the device 210/main user 205, as shown in FIG. 2, eighth step 8. Application 220 then preferably algorithmically populates the second template 235 with one or more contextual factors (device factors, personal factors) regarding any or all of the following: host 215, host location, presentation 213, presentation location, device 210, device location, main user 205, main user location, device behavior, main user behavior, device channel, main user channel, out-of-band factor, device factors, behavior factor, location factor, and custom factor. Application 220 via device 210 may use also native global position system (GPS), accelerometer, Internet Protocol (IP) to geo mapping, services, software or hardware capabilities or custom technology to harvest the contextual factors and triangulate its line-of-sight/sense context with object 238/presentation 213 and server 218 with its digital observations of location and proximity, as shown in FIG. 6. Each mobile computing device preferably will be unique to itself with respect to such capabilities and thus, only needs to match itself and not other devices with differing capabilities or access to factors. The present invention also surpasses conventional security methods by dynamically measuring not just absolute location (Geo, IP) of the session members (host 215, device 210, server 218) but also the proximity of active members (presentation 213, application 220 on the device 210) by nature of verifying both line-of-sight/sound proximity and digital proximity from multiple perspectives. This method is generally the only way to ensure both physical and digital measurements are genuine via multi-source observation and algorithmic context computation. The present invention also preferably measures that not only the members are where the members should be (policy, geo fence, absolute location), but that the members are in appropriate proximity context, such as standing in front of the automated teller machine (ATM) screen, laptop or kiosk from two different methods and means of interrogation: physical and digital.

Server 218 preferably further computes the algorithmic first signature 240 based on additional observation and population of the first template 232 after the device 210 consumption of object 238/second template 235 and any optional delivery of any out-of-band factors to the main user, as shown in FIG. 2, ninth step 9.

Server 218 preferably computes final algorithmic first signature 240 and disposes of the first template 232 and all contextual factors. Preferably, no discrete, non-surrogate factors, challenges, responses, key-value pairs, or personally identifying data are stored on the server 218 or leave server 218 or travel over user channel 222; host channel 224; and smart channel 226 as shown in FIG. 2, tenth step 10.

Optionally, the main user 205 may input into the application 220 on the device 210 any previously or presently delivered out-of-band data such as challenges and responses, transmitted via the out-of-band channel 228 from either the host 215 or server 218. The application 220 may further process algorithmic second signature 243 by using the second template 235. If configured and performed by the main user 205, device 210 or application 220, the second signature 243 is preferably further modified additional real-time personal factors, behavior factors, location factors, and device factors, based on user behavior, location or customization, as shown in FIG. 2, eleventh step 11.

Next, application 220 preferably computes final algorithmic signature of the second signature 243 and disposes the second template 235 and all factors in memory, as shown in FIG. 2, twelfth step 12. Preferably, no discrete, non-surrogate factors, challenges, key-value pairs or data are stored on or ever leave the device 210, or travel over user channel 222, host channel 224 or smart channel 226. The main user 205 is also preferably not responsible for recognition, recall, entry, possession, awareness, exposure, control or knowledge of any and all factors except for optional out-of-band factors.

Over triangulated smart band channel 226, server 218 and application 220 on the device 210 preferably compute or compare purpose-built first signature 240 and second signature 243, respectively, for mutual algorithmic verification, as shown in FIG. 2, thirteenth step 13. The first signature 240 and second signature 243 may be of equal, similar or different mass, structure and format. Further, the algorithmic signature comparison and evaluation may include, but is not limited to: equality, congruence, complement, correlation, masking, challenge-response, summation, computation or any other expected or actual algorithmic result.

If the mutual algorithmic context verification can be achieved (i.e., second signature is essentially identical or substantially similar to the first signature), then total context verification decision 245 is authenticated, and the main user 205/device 210 and host 215 are generally mutually verified by application 220 and server 218, as shown in FIG. 2, fourteenth step 14.

On the other hand, if the mutual algorithmic context verification cannot be achieved (i.e., second signature 243 is not identical or substantially similar to the first signature 240) for whatever reason, then context verification decision 245 is not authenticated, and the main user 205/device 210 and host 215 are preferably not mutually verified by the application 220 and server 218, as shown in FIG. 2, fifteenth step 15.

Preferably, server 15 simultaneously informs application 220 on the device 210 the context verification decision 245 status over the smart channel 226, and host 215 over the host channel 224, as shown in FIG. 2, sixteenth step 16.

All the context authenticity components, factors, processes, channels, sessions, data and context verification decision 245 and algorithms are preferably destroyed and removed from the memory and any areas of the server 218, application 220 on the device 210 and host 215. Further, the host channel 224 and smart channel 226 connection channels are preferably dropped; application 220 is preferably closed; and nothing is preferably written to, seeded or left behind in the process, as shown in FIG. 2, seventeenth step 17.

Optionally, host 215 and/or device 210/main user 205 may proceed with appropriate actions based on the results of context verification decision 245, either alone or in combination with other non-invention processing, results, decisions or status, as shown in FIG. 2, eighteenth step 18.

Optionally, server 218 reprocesses and updates profile algorithm 230 in the cloud based on the results of the context verification decision 245 processing, in the case of either a first enrollment session or an authoritative update for the profile algorithm. Unlike traditional multi-factor or identity approaches, nothing literal is preferably stored in the back-end data store that can identify or remember a user; only a partial algorithm that is applied to actual factor observations to validate or invalidate the authenticity and correlation of ensuing authentication context inputs.

Figure 3:
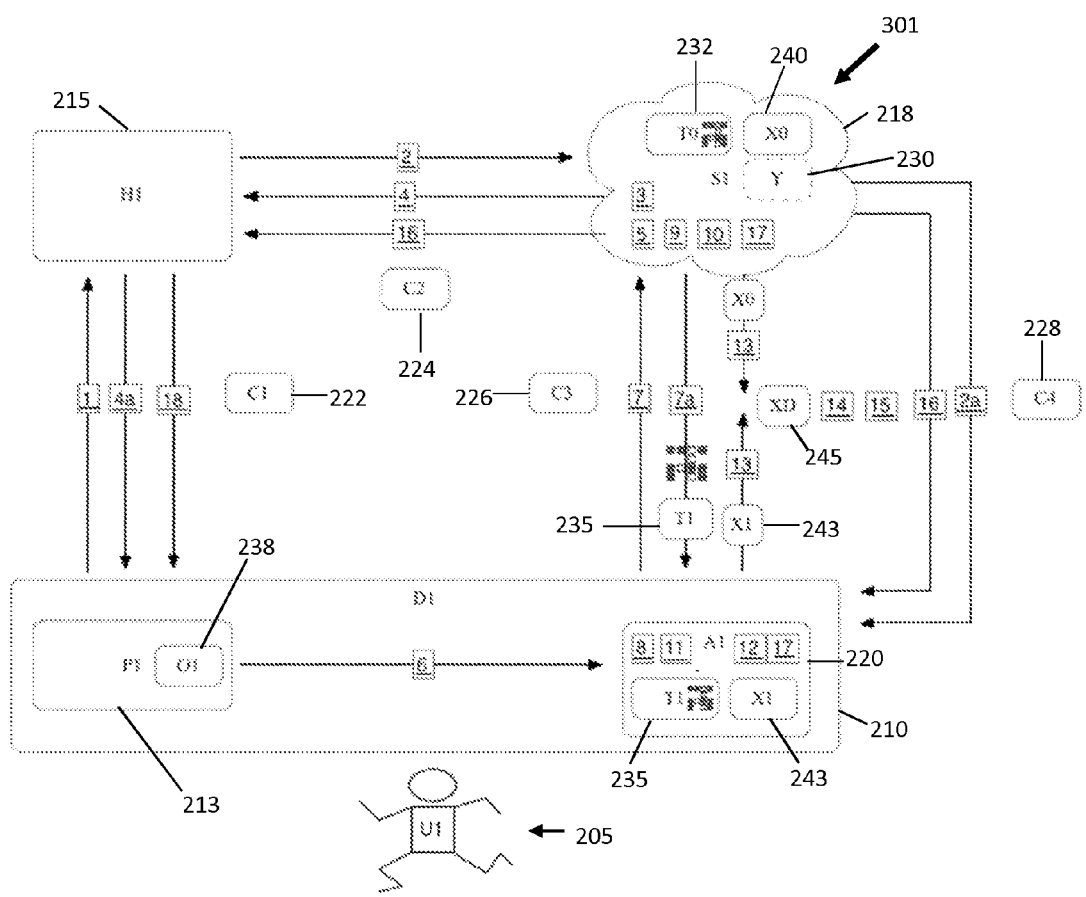
FIG. 3 is a functional flow-block diagram of one embodiment of the mobile security context authentication system and method and shows the functions and steps among a host, user, device, and application to application from within the device.

FIG. 3 is a functional flow-block diagram of one embodiment of the mobile security context authentication system and method and shows the functions and steps among a host, user, device, and application to application from within the device. As shown in FIG. 3, one embodiment of the mobile security context authentication system and method 301 preferably includes: a main user 205; device 210; presentation 213; host 215; server 218; application 220; user channel 222; host channel 224; smart channel 226; out-of-band channel 228; profile algorithm 230; first template 232; second template 235; object 238; first signature 240; and second signature 243. FIG. 3 also shows the steps 1, 2, 3, 4, 4a, 5, 6, 7, 7a, 8, 9, 10, 11, 12, 13, 14, 15, 16, 17, 18 of this embodiment of the mobile security context authentication system and method 301.

FIG. 3 also shows that the steps 1, 2, 3, 4, 4a, 5, 6, 7, 7a, 8, 9, 10, 11, 12, 13, 14, 15, 16, 17, 18 of FIG. 3 are substantially similar to the steps of FIG. 2. However, unlike step 6 of FIG. 2, where the object 238 is sent from presentation 213 to device 210 (e.g., displaying or emitting the object 238 to the device 210), step 6 of FIG. 3 preferably occurs when the object 238 is transmitted or sent from application-to-application. The object 238 is preferably consumed by the main user 205 on device 210 through scanning, sensing, clicking or manually entering the object 238 programmatically with the application 238. (application-to-application rollover, within device), as shown in FIG. 3, sixth step 6.

EXAMPLES

The following are examples are various embodiments of the invention in order to help provide a thorough understanding of various aspects of one or more embodiments of the invention. While multiple embodiments are disclosed, the invention is capable of modifications in various obvious aspects, all without departing from the spirit and scope of the present invention. Accordingly, the following examples are to be regarded as illustrative in nature and not restrictive.

Example #1

The main user 205 preferably logs into a website on a desktop or laptop with a user identification number or via a single-sign-on service (e.g., Twitter®, Facebook®, etc.). Upon logging in, the host 215 may programmatically call the server 218 and is returned a bespoke object, such as a QR code. The main user 205 is typically presented the object on the website display, browser or screen. The main user 205 preferably opens and activates his or her iPhone®, a mobile device (i.e., device 210), scans, or senses the object or code on the screen. The object or code preferably triggers the mobile invention application 220 to contact the server over the secondary channel, and both typically begin to mutually interrogate each other, the site, session and context and preferably algorithmically compute the one-time signatures (i.e., first signature 240, second signature 243). Using GPS and IP-location, the server 218 and application 220 of the device generally measures the location of both the original object on display (i.e., object 238) and the location of the main user 205 and device 210 for both absolute and proximity calculation. These factors are preferably, algorithmically applied at each end to the signature. Upon mutual verification of those signatures by the mobile application 220 and server 218, the authentication decision is preferably reached and status (i.e., context verification decision 245) is generally communicated to all parties. All other processing is handled passively without user involvement or knowledge, interrogation or challenge/response. The main user 205 is generally then free to proceed into the site having been given permission by the site based on a positive authentication status, or denied based on a negative one. As such, definitive multi-factor context authentication is preferably achieved.

Example #2

The main user 205 opens a gaming application on their mobile Android® device. From within the gaming application, the application 220 is called on the device 210 through an inner-device API (an application programming interface called a protocol handler in this instance). Preferably, no code, scan or manual entry is generally required. The session link is generally passed from game to the application 220 seamlessly via protocol handler—i.e., rolling over in an application-to-application fashion. Upon launch of that application 220, the location and behavior of the main user 205 (orientation of the device 210) are measured along with the corresponding standard credentials and algorithmically applied to the signatures on each side (e.g., first signature 240 and second signature 243). No data discrete is generally sent beyond the device or server, aside from the resultant signatures. In this case, it is generally found that the signatures (second signature 243 and first signature 240) do not match or correlate. The main user 205 therefore typically fails to authenticate and is generally denied access to the game. Under the hood, it is preferable because the main user 205 is in a country not authorized to play that game, but neither this detail nor the ability to circumvent its enforcement is exposed to the main user 205, the network or the session. Security protection is typically achieved through context-aware authentication.

Example #3

The main user 205 logs into a site (host 215 at presentation 213) as in the first example, but from a brand new mobile device (i.e., second device), not previously recognized or registered. The main user 205 typically scans the screen after login and fails authentication (i.e., the second signature 243 does not match the first signature 240) due to bad device factors credentials. The user is then presented with a private, one-time challenge out-of-band factors, sent out of band (via private Tweet® from Twitter®, per preference) that main user 205 preferably enters into the mobile device application (i.e., application 220) on the second device. This entry is synthesized with the rest of the second template 235 factors to create a new modified second signature. The modified second signature is preferably re-compared with the newly modified first signature, privy to the custom challenge sent, and both modified signatures now match, allowing for successfully context authentication, and immediate update of additional second device data factors back on the server 218. Preferably, no literal device had to be sent over the smart channel 226 and the user was generally, swiftly authenticated in context. In this case, the invention server 218 instance of profile algorithm 230 is preferably updated due to the modification of the new, blessed device.

These examples are merely illustrative of and not limited to the total options and possibilities of applying this invention to alternate, new and emerging technologies and capabilities with respect to host, user, device or server context verification and authentication requirements, constraints, opportunities and embodiments.

Additional Information

The first template 232 and second template 235 are preferably disposable, purpose-built, surrogate, context-specific and dynamic in mass (i.e., size, sequence, format, structure, depth and quantity of registers) whose composition and population algorithm is generally defined by the context and member processing. The mutual verification decision by the server 218 and the device 210 is generally achieved algorithmically, not by a "lookup and match" process based on static, fixed, or reusable reference information. Neither the first template 232 nor the second template 235 is the match authority for the other (or others in the case of many). The context verification decision 245 of the template signatures (i.e., the first signature 240 and second signature 243) is generally mathematically achieved or not. Preferably, the detailed results of the context verification decision 245 or anticipation thereof cannot be computed or known by either the server 218 or device 210 in advance until either the server 218 or device 210 enters into the processing context session with all members present based on the profile algorithm-generated templates.

Generally, the profile algorithm 230 is the persistent element of the processing of the server 218 that represents a unique context of a user, device, site, session, behavior, location, proximity and custom factors. Each context preferably has a unique algorithm stored in the server cloud either generated at first registration or referred to upon subsequent authentication for template generation and resultant processing. In normal use, the profile algorithm 230 is used to generate two templates (as shown in FIG. 2, step 3) when requested by host 215 to authenticate the main user 205/device 210 context. The first template 232 destined for processing by the server 218 is generally more complete while the second template 235 for application 220/device 210 consumption is generally less complete. Both the first template 232 and second template 235, however, are generally based on the profile algorithm 230 mathematical seed used to assert correlation later during context verification decision 245 processing, as both the first template 232 and second template 235 are modulated by dynamic and random factor input and influence, resulting in potentially correlative decision signatures. The profile algorithm 230 is then preferably used to process the first signature 240 and second signature 243 to ascertain correlation by both the application 220/device 210 and server 218 for mutual authentication without requiring a single authoritative lookup or match. All components decisions processed by context verification decision 245 are generally purpose built and are mathematically universally unique. The approach of the present invention is revolutionary over existing methods, in that the existing methods rely on simple pattern matching or persistent public/private key distribution, custody, and maintenance. The mobile security context authentication system and method of the present invention, however, preferably allows for the use of multiple devices without key distribution, automatic enrollment at first use, and capacity to process infinitely measurable factors, behaviors and contexts. Furthermore, unlike conventional security authentication methods and schemes, the host 215, main user 205, or device factors, algorithms, or signatures are not federated on the server 218 to avoid cross-context management and association of privacy risk. While existing and conventional security authentication methods may utilize such federation as a feature or benefit, the present invention regards context federation as a liability. As such, the association of privacy risk generally must be managed, enforced, and verified (independently from the invention) and generally do not add to the usability, strength or security of the present invention.

Generally, the present invention does not allow discrete data to be reused or sent between the internal processing layers or external communication channels in a non-synthesized, non-surrogate form. Additionally, no data key value pairs generally ever travel over the same transmission channel. The challenges and responses generally do not travel over the same transmission channel in the same direction (i.e., user channel 222, host channel 224, and smart channel 226) and no discrete data generally ever leaves the internal layer in which the internal layer was observed or interrogated.

The entire context verification decision 245 process is generally both triangulated and air-gapped among the host 215, the server 218, and device 210/main user 205 across encrypted channels the user channel 222, host channel 224, and smart channel 226 (and optionally the out-of-band channel 228). Preferably, no non-surrogate identifiers relating to the host 215, device 210, or main user 205 are transmitted alone or in key-value pairs. The random factor values are generally applied algorithmically to each template value as opposed to literally transmitted, inspected or identified.

The resultant signature comparison process of the context verification decision 245 generally applies the profile algorithm across the spectrum of all possible and factual multi-mass factor values amongst first signature 240 and second signature 243 to achieve context verification without individual factor identification, lookup or matching. This one-way processing preferably achieves either context verification decision correlation or non-correlation, but never association or definition, based on the profile algorithm.

Authentication and context processing data preferably flows simultaneously bi-directionally across the encrypted user channel 222, host channel 224, and smart channel 226, thereby ensuring immunity from interception, correlation, replay or predictability. Unlike systems disclosed in existing references, which transmit the secure data flow in one direction from source to authority, through the host 205, presentation 213, and device 210 to equivalent server 218 for inspection/comparison (often as an encoded, encrypted or obfuscated key-value pair), the present invention preferably separates and bifurcates that surrogate flow by design as a method for more mutual, secure, private and effective interrogation, measurement, integrity, analysis and immunity from compromise.

The host 205, server 218, and main user 205/device 210 are preferably members of an interdependent authentication context formula that departs from the traditionally client-server, shared-secret model. Unlike existing methods, there is usually no persistent authority (data lookup and compare/match) in the present invention. Only through active presence and participation by all members and multi-perspective interrogation of any or all factors can the context verification decision 245 be mutually agreed upon. All factors merely and typically influence the authentication algorithms and therefore usually modify the resultant signatures for mutual authentication, rather than transmit in whole or in part for eventual authoritative comparison against a stored and retrieved reference value. This separation of concerns in the present invention is novel, contextual, interdependent, and strong innovation with respect to context authentication and privacy.

Transmission and embodiment of object 238 (via the presentation 213) may be performed by any method or mode required or supported by the technical transmission and consumption opportunities or limitations of the host 215 and device 210, across the user channel 222, host channel 224, and smart channel 226. These conceptual areas are generally known by those having ordinary skill in the art and are typically covered by existing references; and are merely employed to support maximum effective and successful transmission of the object 238 in many various contexts. Examples of such embodiments for the transmission of object 238 include, but are not limited to: (1) visual image, tag, video or QR code link presented by a browser, display or printable object, scanned by a mobile electronic computing device with such capabilities; (2) audible signal transmitted and sensed by a mobile computing device from a source; (3) textual, visual, audible or programmatic transmission via SMS, MMS, email, Tweet®, direct message, chat, browser hyperlink, app, display, physically printed or visually encoded stream to a mobile computing device; (4) near-field (NFC) encoded stream transmitted and consumed by mobile computing device; (5) sensory transmission and consumption of behavior such as gestures, device bumping, movement, acceleration, motion, proximity or other stimulus/response mechanisms; (6) programmatic interface exchange of data such as RPC, API, in-memory process, database query, pulse, timecode, cached or inter-process communication; (7) human manual or gesture entry of data received or deduced from oral, written, dramatic, musical, visual, emotional, historical, interpretive or other non-computing transmission; and (8) any or all of the above transmitted, received and consumed either in-band or out-of-band, with or without the assistance of intermediary technology, humans, symbols or language.

The use of QR codes in the present invention, as opposed to all existing methods, are merely utilized for their main purpose—to simply transmit a universal resource locator (URL) link to the application 220 on the device 210 through scanning and decoding, linking, entering or processing. Conventional methods generally rely upon the use of QR codes to embed, encode or encrypt secret session, website, user, or challenge information to be decoded and later paired with device or user factors and sent in tandem to the back-end service for identification. When used, the present invention avoids overloading of the QR code and simply relies upon the QR code for its open and patent-free intended purpose—i.e., providing an elegant and usable method to transmit a URL or session target from the presentation screen 213 to the mobile application 220 through optical scanning by the camera of the device 210 and decoding by the application 220.

All the multi-mass factors may be any or all contextual factors that can be challenged, interrogated, sensed, inferred, performed, immediately or historically measured by one or more members, individually, or in combination with other factors or members, from one or more perspectives and channel pathways, at one or more times during the lifecycle of the session or across multiple sessions. The present invention preferably assumes a multi-mass signature (server signature 240/second signature 243) based on an interrogation and a profile algorithm-generated template population of one to many individual context factors that include, without limitation: (1) server, device, session, network or user characteristics, attributes or context; (2) member, device, presentation or network location, proximity or boundaries; (3) fixed, original, defined, proximal, relational, absolute or mobile location or movement; (4) user or device behavior, gesture, statistics, orientation, performance, response or pattern; (5) challenge/response, "gamified" user behavior, test, skill, activity, recall or recognition; (6) historical analysis of data, statistics, behavior, context, location, proximity or motion; (7) individual text challenges and responses, images, strings, phrases, words, PINs, numbers; and (8) other factors enabled or supported by emerging host 215, device 210, or server 218 technology or processing.

Examples of such factors may be the main user 205 successfully authenticating with all normal credentials when the main user 205 is holding the mobile device 210 in portrait mode facing north. These behaviors and locations act as multi-mass factor inputs to the algorithmic processing of the first template 240 and second template 243 to arrive at the signature decision. Any other orientation would affect and yield an invalid signature, but not reveal the nature or cause of the failure to the network, user, or a hacker.

Another example may be the historical measurement of the main user 205/device 210 location, movement or even motion (walking gait, reference device carried height, range of motion, etc.) over time. If, upon authentication, those factors were out of proportions with normal historical usage, otherwise acceptable credentials would typically fall out of context (signature) or perhaps trigger additional out-of-band rigor to verify. However, the credentials are neither used for nor physically inspected or transmitted in a manner that individually identifies the user in a non-private, immutable fashion.

The mutual authentication and context verification decision 245 are preferably designed for the purpose of enabling the main host 215 or main user 205/device 210 to access, authorize, enter, submit, verify, confirm, present, download, stream, purchase, modify, delete, cancel or otherwise interact with appropriate entitlement any session, resource, data, physical/virtual location, content, goods, services, media, experiences, connections, accomplishments, messages, etc. either solely upon its merits (pass/fail) or in combination with other context verification decisions 245 or pre-existing, parallel or post-processing, native or external, identity or authentication methods, credentials or decisions. The context verification decision 245 may also be based on processing one or more hosts, users, devices, and templates for all factors in isolation, sequence or combination context. For example, where no host 215 exists, the entire context verification decision 245 process may occur among first user/first device, second user/second device and the server 218 to provide peer-to-peer context verification decisions. Another example may be when multiple user/device combinations against a single host 215/server 218 are contextually verified to jointly authenticate and unlock a common resource or asset in the host 215.

As shown in FIG. 2, user channel 222, host channel 224, smart channel 226 (and out-of-band channel 228) may involve homogeneous or heterogeneous communication channels and technologies, directional flows, transmission mediums (either encrypted or unencrypted), human or digitally mediated, proxied or direct, at simultaneous or staggered times or time to live (TTLs). The user channel 222 may traditionally be a web connection between the host 215 and the end user display device (presentation 213 or device 210 in case of on-mobile browsing/application). The host channel 224 may be a private connection between the host 215 and the server 218. The smart channel 226 is preferably a second private connection between the server 218 and the device 210 of the main user 205. The out-of-band channel 228 preferably represents an optional additional channel between either: (1) the host 215 and/main user 205/device 210; or (2) server 218 and main user 205/device 210, such as email, SMS, chat or voice calls to deliver one-time, out-of-band factors or data to the user for use within the invention flow.

Preferably, at no time are the templates, context verification decisions, factors, or channels capable of or used for the purpose of identifying, exposing or recording the identity of the main user 205 or device 210 in the process, only to authenticate and verify the context against previously verified contexts. An example of this would be the conventional approach of recording the IP address of host 215 or device 210 endpoints of any equivalent channel (e.g., user channel 222, host channel 224, smart channel 226, and out-of-band channel 228). The present invention merely typically uses these inputs to modify the algorithm and resultant affect on the template signature, an obviously an innovative and more robust, secure and private approach.

Preferably, the only main user 205/device 210 data persisted at server 218 are profile algorithms used to process the device factors and personalization factors (i.e., behavior, location, proximity, custom) in a non-associative, algorithmic form that feeds the composition and processing of the first template 232. Preferably, the server 218 cannot use the profile algorithm, device factors, or personalization factors repeatedly or predictively to identity a user, device, session, location or context at any time before or after an active session. Rather, the server 218 can only serve to provide inputs into the real-time processing and modification of the first template 232 within the active session that eventually leads to a mutually verified result—i.e., the context verification decision 245, with processing done in real-time at the device 210 upon the creation and comparison of the second template 235.

Context verification decision 245 data is generally not stored, persisted on, or recalled from the device 210 or the main user 205. Preferably, all the factors stored within the device 210/main user 205 are dynamically interrogated, queried, sensed, or prompted for in real-time by the application 220, processed into the second template 235 (and eventually the second signature 243), and immediately disposed from memory. Generally, no discrete all factors from the device 210/main user 205 are transmitted outside of the device 210 across user channel 222/host channel 224/smart channel 226 at any time. Unlike conventional authentication methods, the present invention preferably does not rely upon cookies, certificates or persistent public-private keys seeded, either stored or referenced, upon the device.

The location triangulation among host 215, device 210, and server 218 is generally accomplished through a synthesis of line-of-sight, ambient sound or direct or physical vibration/motion/sensation and the digital information obtained from location aware technology including, without limitation: GPS, carrier code, IP to location mapping, optical verification of a common universally unique visual field or perspective, audible verification of a common acoustic environment or perspective (shown in FIG. 6). For example, location factor is preferably computed by both the server 218 and the application 220 on the device 210 via multi-perspective, triangulated synthesis of the digital and physical location data of the host 205, presentation 213/object 238, and device 210 at point of delivery, presentation, consumption, processing and messaging in relation to the server 218. Preferably, no single source of location factor data is considered authoritative, just as with the context verification decision 245 itself. Preferably, all components either align or equate, or the context cannot be verified.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

Part 2—Gamification

Figure 4:
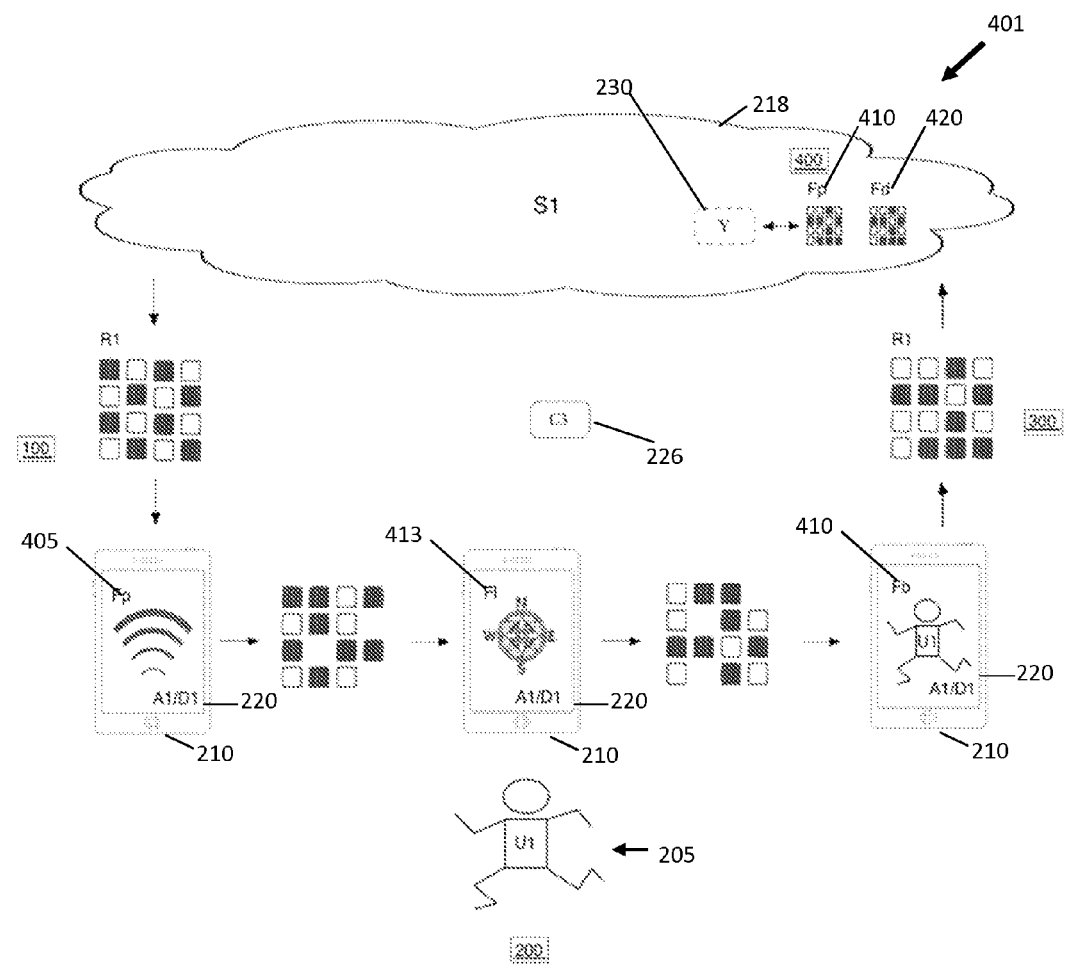
FIG. 4 is a functional flow-block diagram of one embodiment of the gamification process of the mobile security context authentication system and method and shows the initial steps of the gamification process—i.e., selecting and configuring the contextual factors such as the location factors, behavioral factors, and custom factors

FIG. 4 is a functional flow-block diagram of one embodiment of the gamification process of the mobile security context authentication system and method and shows the initial steps of the gamification process—i.e., selecting and configuring the contextual factors such as the location factors, behavioral factors, and custom factors. As shown in FIG. 4, one embodiment of the mobile security context authentication system and method 301 preferably includes: a main user 205; device 210; server 218; application 220; smart channel 226; and profile algorithm 230. FIG. 4 also shows the steps 100, 200, 300, 400 of one embodiment of the gamification process 401 of the mobile security context authentication system and method 401.

The gamification of the present invention, preferably refers to infusion of user behavior, traits, behavioral design techniques, and/or user style for the authentication process. The gamification process of the invention is used preferably one or more applications and processes to improve the authenticating process.

FIG. 4 shows the first step 100 of the gamification process, within the context of a normal user login, access, or authentication context verification on via application 220 on device 210 to host 215 at presentation 213. Specifically, as shown in FIG. 4, main user 205 may affect, control, and strengthen the processing of the second template 235 for second signature 243 through in-application 220. Specifically, the main user 205 may strengthen the processing of the second template 235 for the second signature 243 by incorporating, configuring, and/or operating the personal user or device factors: (1) behavior; (2) location; and (3) custom factors.

These processing constraints may be over and above what host 215 or server 218 may require, affording the main user 205 control and customization. As a result, additional strength, privacy and robustness, of the authentication context verification typically occurs.

During the registration process R1, as shown in the second step 200 in FIG. 4, the main user 205 preferably performs the processing of the second template 235 for the second signature 243. This may be performed by the main user 205 by selecting, opting-into, purchasing, configuring, and/or performing the processing to interrogate and process any or all of the user factors (via in-application purchase and controls within the application 220 on the device 210): personal factors 405 comprised of: (1) behavior factors 410 (i.e., something the user or device does or can do); (2) location factors 413 (i.e., somewhere the user or device is, or is in relation to); or (3) custom factors 415 (i.e., custom factors of knowledge, preference, skill or chance).

Next, the third step 300 of FIG. 4 shows that, during the registration process R1 by the application 220, the behavior factors 410, location factors 413, and custom factors 415 are generally interrogated along with the standard multi-factors per the policy of the main user 205 or configuration. The population of the second template 235 and the processing of the first signature 240 is generally affected by these factors and that algorithmic processing is usually transmitted to the server 218 and recorded as an update to profile algorithm (alongside standard device factors) for use in future the server's first template 232 to first signature 240 generation and processing.

FIG. 4 shows the fourth step 400 of the gamification process 401 where the personal factors 405 are computed as part of the second template 235. Specifically, the behavioral, locational, and custom subcomponents of the personalized factors algorithm are preferably not transmitted to the server 218 in discrete form, but are rather preferably computed as part of the second template 235 during the first registration in algorithmic form. The personalized factors algorithm is preferably added to the processing of the second template 235 to the second signature 243 (along with the device factors), but alone does not contain or reveal any literal or identifying behavioral factors 410, location factors 413, custom factors 415, or data. Generally, use of the out-of-band factors along with a re-registration (i.e., subsequent registrations) can update the profile algorithm on the server 218.

Figure 5:
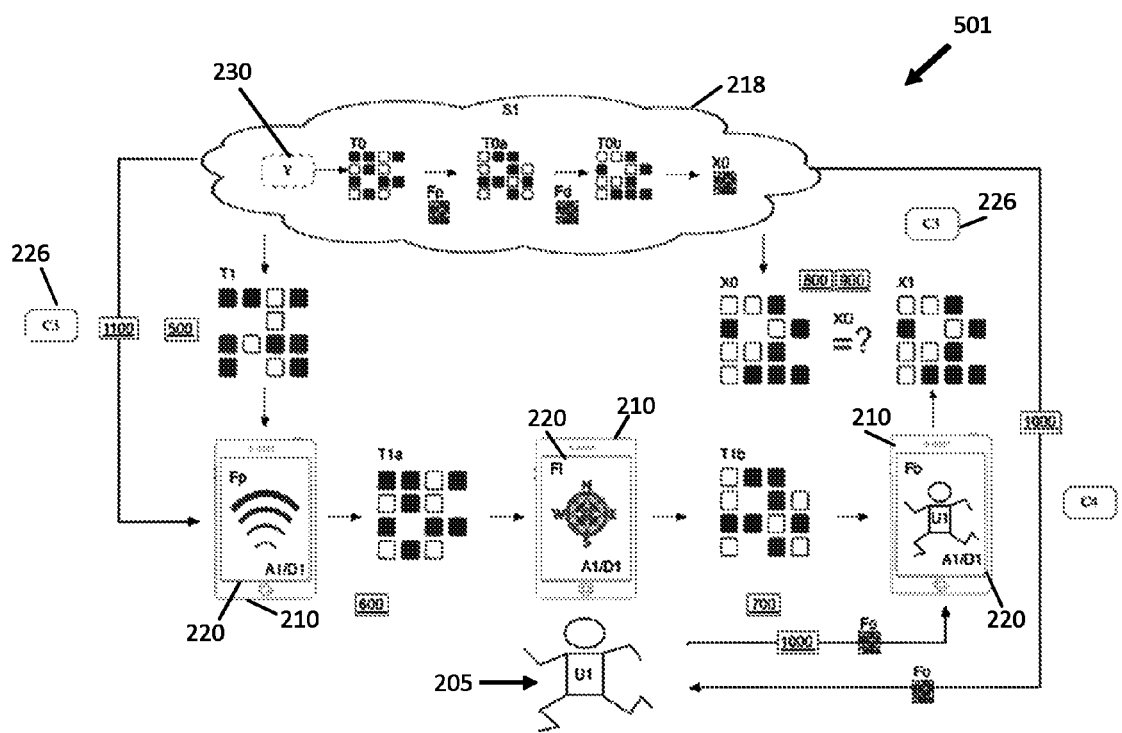
FIG. 5 is a functional flow-block diagram of one embodiment of the gamification process of the mobile security context authentication system and method and shows the last steps of the gamification process—i.e., processing of the first template by the server and the second template by the application of the device.

FIG. 5 is a functional flow-block diagram of one embodiment of the gamification process of the mobile security context authentication system and method and shows the last steps of the gamification process—i.e., processing of the first template by the server and the second template by the application of the device. As shown in FIG. 5, the fifth step 500 of one embodiment of the gamification process occurs when the application 205 processes the second template 235 to create the second signature 243. In particular, during the ensuing authentication process, the main user 205, application 220, or device 210 processes the second template 235 to create the second signature 243 by preferably interrogating the "performance" or "interrogation" of the personal factors 410 (i.e., behaviors, locations, proximities and custom factors) alongside the traditional second template 235 population. The application 220 via the device 210 preferably senses, interrogates, and captures these factors via its native GPS, accelerometer, software or hardware capabilities or custom technology. The application 220 also preferably measures the relationship between the physical line-of-sight/sense/scan and digital location data (proximity), its absolute location, or location against another fixed-point, device or reference item, as shown in FIG. 6. With this data populated into the second template 235, second signature 243 will then preferably be computed and compared and/or correlated with server 218 version of first signature 240, over the smart channel 226.

When either the host 215 or main user 205 requests an context verification decision 245, the processing of the first template 232 to the first signature 240 is preferably processed on the server 218 according to the personal factors 405 that influence the profile algorithms, as shown in FIG. 5, sixth step 600.

Then, upon processing the second template 235, the application 220 preferably interrogates, recreates and/or performs the actual metrics of the personal factors 405 along with balancing of all of the existing factors to create the second signature 243, as shown in FIG. 5, seventh step 700.

If the first signature 240 does not match the second signature 235, the context verification decision 245 is preferably false or unauthenticated. On the other hand, if the first signature 240 matches the second signature 235, the context verification decision 245 is preferably considered true or authenticated, as shown in FIG. 5, eighth step 800.

Alternatively, if the first signature 240 is not complementary or correlative to the second signature 243, the context verification decision 245 is preferably considered false or unauthenticated. If the first signature 240 is complementary or correlative to the second signature 243, the context verification decision 245 is preferably considered true or authenticated, as shown in FIG. 5, ninth step 900.

Optionally, if the first signature 240 does not match the second signature 243 for any reason, the server 218 or host 215 may send the out-of-band factors to the main user 205 via the out-of-band channel 228 for entry into the second template 235. The server 218 may do the same with the first template 232, re-compute first signature 240/second signature 243 and permit an update to either the device factors, personal factors 405, or both, as shown in FIG. 5, tenth step 1000. This may occur when a new, unrecognized device is utilized; when the location factors changes; or a new or different user behavior factors or custom factors are performed or observed by the application 220 on the device 210 during authentication.

Optionally, the host 215 may require the server 218 to enable all the personal factors 405 and device factors from its initial request to authenticate over host channel 224, thus enabling the above functionality to be passively interrogated and processed via the application 220 on the device 210 with or without main user 205/device 210 permission, awareness or intentional participation for the population of the second template 235 and the computation of the second signature 243, as shown in FIG. 5, eleventh step 1100.

EXAMPLES

The following are examples are various embodiments of the invention in order to help provide a thorough understanding of various aspects of one or more embodiments of the invention. While multiple embodiments are disclosed, the invention is capable of modifications in various obvious aspects, all without departing from the spirit and scope of the present invention. Accordingly, the following examples are to be regarded as illustrative in nature and not restrictive.

Example #1

In this first example, one will assume that the main user 205 is preferably engaging a normal authentication flow against host 215 from device 210, as described in the first invention, and has preferably selected, purchased, configured the application 210 to perform additional, personalized authentication behavioral factor rigor. Upon login, the process of the main user 205 preferably provides all the valid credentials but does not usually perform any special behavior. The main user 205 is met with a failed status (generally resulting from a mismatch between second signature 243 and first signature 240 due to missing personal factors factor algorithm influence and resultant signature modification). Upon retry, the main user 205 preferably holds the device 210 in portrait mode to scan and may shake the device in a certain motion (i.e., the expected behavior). As a result, the main user 205 is preferably met with successful authentication status (i.e., second signature 243 matches the first signature 240) due to the application of the appropriate factor influence on the signature processing.

Example #2

In this second example, the main user 205 preferably has pre-configured, for protection, (through in-application purchase, selection and configuration) the constraint of failing to authenticate if the context is such that his or her device 210 is not in the same location as presentation 213, or his or her device 210 is not in the same locale as when the main user 205 first registered (i.e., first registration). The main user 205 logs in, scans the webpage authentication code, and fails to authenticate, realizing that he or she is overseas and not in his or her home locale. The main user 205 retries and is prompted with an out-of-band factor to verify they wish to add this locale as a trusted one. The main user 205 receives the out-of-band factor via email, enters it into the application 220 on device 210 and a new modified second template is computed, compared with the commensurate server 218 modified first template. The main user 205 is then preferably authenticated. In addition, the server 218 version of the main user 205 profile algorithm 230 (via specifically personal factor/location factor) is updated for the new locale influence for future processing.

Example #3

In this example, the main user 205 has preferably configured the application 220 with a custom personal identification number (PIN) to unlock the application when used on the device 210. If the main user loses his or her device 210, and another user tries to authenticate in context, without entry of that personal identification number, the second signature 243 will not match the first signature 240, and authentication will typically fail (thus protecting the main user 205 and device 210). The process will generally not reveal why the failure happens to ensure the other user does not gain insight or information to retry or attempt replay, reverse engineering or modification of the context to gain illicit access. Upon retrieval of the device 210, the proper, main user 205 enters his or her PIN and may resume seamless and appropriate contextual authentication.

These examples are merely illustrative of and not limited to the total options and possibilities of applying this invention to alternate, new and emerging technologies and capabilities with respect to user or device behavior, context, location or customization.

Additional Information

Despite infinite discrete possible values or combinations for personal factors or device factors, the algorithmic representation within first template 232/second template 235, and therefore, first signature 240/second signature 243 will preferably be universally unique but of a resolute value of predictable depth for re-processing by the server 218 or device 210, respectively. It is permissible for first template 232 and second template 235 (as well as first signature 240 and second signature 243) to be either of similar or different composition, depth, length and/or structure.

The effect of personal factors upon context verification decision 245 is fully within the main user 205 control, and its processing is preferably irrelevant to host 215, who is merely concerned with overall definitive context verification decision 245 status. This preferably illustrates the innovation and novelty of this invention under the auspices of the main user 205 with respect to strengthening, privatizing or personalizing their authentication context via the application 220 over and above the demands of server 218 or host 215.

The personal factors and device factors preferably cannot, and do not, identify the main user 205 or the device 210 outside of the context of the first signature 240/second signature 243 context signature processing and context verification decision 245. They are preferably not independent factors or meaningful user or device identifiers in any respect.

The behavioral factors can be any of, but not limited to, the following: the main user 205 or device 210 gesture; main user 205 or device 210 motion; main user 205 or device 210 orientation; and historical behavior over time, such as the gait, height, motion, speed, gesture of the main user 205, or the performance of the main user 205 via any act, gesture, motion or behavior in response to a game, challenge, stimulus or instruction presented on device 210.

Location factors may be any of the following, but not limited to: the main user 205 or device 210 location at registration versus authentication; main user 205 or device 210 location against predefined server 218 policy constraints; main user 205 or device 210 proximity to another user, device, host or presentation; main user 205 or device 210 proximity to the presentation 213; main user 205 or device 210 location or proximity against a previous location or proximity; main user 205 or device 210 absolute location or proximity to any known point; main user 205 or device 210 parallel or contrary motion against a location or proximity.

Custom factors may be any of the following, without limitation: main user 205 custom personal identification number (PIN); main user 205 custom challenge; the main user 205 and host 215 shared secret; third party challenges or factors; hardware tokens or challenge factors; and API driven factors such as detecting presence of other services, devices, applications or data.

Part 3—Triangulation

FIG. 6 is a functional flow-block diagram of one embodiment of the mobile security context authentication system and method and shows the triangulation among the host, presentation, device, and server. As shown in FIG. 6, one embodiment of the mobile security context authentication system and method 301 preferably includes: a main user 205; device 210; presentation 213; host 215; server 218; application 220; user channel 222; host channel 224; and smart channel 226. Preferably, the triangulation between host 215, presentation 213, device 210, and server 218 are measured in terms of physical line-of sight/sound/sensation. This may occur through the application 220 on the device 210, server 218, and digital location data such as GPS and Geo-IP mapping. For example, host 215 may provide its digital location data through Geo-IP mapping by providing its IP address. Similarly, the device 210 may also provide its digital location data through its GPS data. Although FIG. 6 shows triangulation among the user channel 222; host channel 224; and smart channel 226, it should be understood that multiple channels may be used without deviating from the scope of the invention.

Embodiments

In a broad embodiment of the invention, it is applied as a layer of authentication security above username and password, single-sign-on or social login implementations as a multi-factor or defense-in-depth approach to establishing trust, authenticity and context of the members of a website, application, network, computer hardware, computer software or computer game session.

In another embodiment, the invention could be used standalone as a sole means of identifying and authenticating a user or device against a server, website, or application with a single scan and triangulated context verification.

Another embodiment involves the application of this invention to enforce authentication for users accessing physical locations protected by locked entry, capable of interface with a mobile electronic computing device via line of sound, sight, sensation, NFC and textual data entry or biometric command, such as a door, window, vehicle or vault.

Another embodiment involves establishing authentication context verification to support a payment, form submission, access, modification, interaction or execution of a process within a program, website, app, server, network or session where login/identity is not the goal, but in-process verification, entitlement or authorization of an action by a previously identified and/or authenticated user or device.

Another embodiment involves the implementation of the invention in a media environment (set-top device, television, display, cinema, open-air audio, broadcast, live event, gaming console) where the mobile and the screen interact to authenticate the user/device/location context to enable access, interaction or entitle engagement with the media, game or content. An example would be a hotel room or store with a set-top DVR or broadcast capability, access to which is authorized through authentication by the invention.

Yet another embodiment involves the application of the invention with paper or printed materials for real-time authentication and payment processing, proof of receipt or acknowledgment, verification of attendance, access or permission to entry or engagement with the content, location or assets symbolized by the printed material. Users scan the material and are authenticated in context of the location, device, user, session and other factors.

Another embodiment involves the use of multiple, simultaneous applications of the authentication invention to co-authenticate overlapping contexts to provide mutual access to a common asset by multiple users, devices or locations.

Another embodiment involves utilizing the invention technology to provide authentication control over social media, content and connections, over and above the native social network security mechanisms, to provide granular and time-extended user control over authenticated peer context access, download and engagement with that content or connections.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A computer-based multi-factor user authentication method across a mobile network, the steps comprising:
   providing a server and one or more applications,
   wherein said server includes a profile algorithm;
   receiving a request for an access to a host by a main user at a presentation over a user channel;
   receiving a requesting said-serve to perform a context verification decision from said host over a host channel;
   creating two or more template objects by said profile algorithm of said server;
   wherein said two or more template objects are a first template and a second template;
   sending an code object to said host over said host channel by said server;
   wherein said code object is presented to a device of said main user at said presentation and over said user channel by said host;
   wherein said device comprises said one or more applications;
   wherein said code object triggers said one or more applications to contact said server, such that said server and said one or more applications mutually interrogate each other, such that one or more one-time signatures are algorithmically computed;
   processing said first template by said server;
   wherein said processing step of said first template is based upon one or more contextual factors;
   populating said first template by said server;
   creating and storing a first signature by said server;
   wherein said creating step of said first signature is based upon said processing step of said first template;
   wherein said code object is consumed by said main user on said device through said one or more applications;
   requesting said second template on said server over a smart channel by said one or more applications;
   sending said second template to said one or more applications on said device over said smart channel by said server;
   processing said second template by said one or more applications;
   populating said second template by said one or more applications;
   creating and storing a second signature by said one or more applications;
   wherein said creating step of said second signature is based upon said second template; and
   performing said context verification decision when comparing said first signature and said second signature over said smart channel.

2. The computer-based method of claim 1, wherein one or more additional external factors are provided to said device by said host over said out-of-band channel.

3. The computer-based method of claim 1, the steps further comprising:
   deleting said one or more contextual factors by said server.

4. The computer-based method of claim 1, wherein said processing step of said second template is performed based upon one or more contextual factors.

5. The computer-based method of claim 1, wherein said creating and storing step of said first signature is based upon said consuming step of said code object.

6. The computer-based method of claim 1, wherein said creating and storing step of said first signature is based upon said processing step of said second template.

7. The computer-based method of claim 1, wherein one or more out-of-band data is inputted into said one or more applications;
   wherein said one or more out-of-band data is transmitted over said out-of-band channel.

8. The computer-based method of claim 1, wherein said comparing step of said first signature and said second signature is performed by said server.

9. The computer-based method of claim 1, wherein said comparing step of said first signature and said second signature is performed by said one or more applications.

10. The computer-based method of claim 1, the steps further comprising:
    authenticating said device when said first signature is essentially identical to said second signature.

11. A computer-based multi-factor user authentication method across a mobile network, the steps comprising:
    providing a-hose a server and one or more applications,
    wherein said server includes a profile algorithm;
    receiving a request for an access to a host by a main user at a presentation over a user channel;
    receiving a request said-serve to perform a context verification decision from said host over a host channel;
    creating a first template and a second template by said profile algorithm of said server;
    sending an code object to said host over said host channel by said server;
    wherein said code object is presented to a device of said main user at said presentation and over said user channel by said host;
    wherein said device comprises said one or more applications;

wherein said code object triggers said one or more applications to contact said server, such that said server and said one or more applications mutually interrogate each other, such that one or more one-time signatures are algorithmically computed;
processing said first template by said server;
wherein said processing step of said first template is based upon a first set of one or more contextual factors;
populating said first template by said server;
creating and storing a first signature by said server;
wherein said creating step of said first signature is based upon said processing step of said first template;
wherein said code object is consumed by said main user on said device through said one or more applications;
requesting said second template of said server over a smart channel by said one or more applications;
sending said second template to said one or more applications on said device over said smart channel by said server;
processing said second template by said one or more applications;
populating said second template by said one or more applications;
creating and storing a second signature by said one or more applications;
wherein said creating step of said second signature is based upon said second template;
performing said context verification decision when comparing said first signature and said second signature over said smart channel; and authenticating said device when said first signature is identical to said second signature.

12. The computer-based method of claim 11,
wherein one or more additional external factors are provided to said device by said host over said out-of-band channel.

13. The computer-based method of claim 12, the steps further comprising:
deleting said one or more contextual factors by said server.

14. The computer-based method of claim 13, wherein said processing step of said second template is performed based upon a second set of one or more contextual factors.

15. The computer-based method of claim 14, wherein said creating and storing step of said first signature is based upon said consuming of said code object.

16. The computer-based method of claim 15, wherein said creating and storing step of said first signature is based upon said processing step of said second template.

17. The computer-based method of claim 16, the steps further comprising:
wherein one or more out-of-band data is inputted into said one or more applications;
wherein said one or more out-of-band data is transmitted over said out-of-band channel.

18. The computer-based method of claim 17, wherein said comparing step of said first signature and said second signature is performed by said server.

19. The computer-based method of claim 18, wherein said comparing step of said first signature and said second signature is performed by said one or more applications.

20. A computer-based multi-factor user authentication method across a mobile network, the steps comprising:
providing a server and one or more applications,
wherein said server includes a profile algorithm;
receiving a request for an access to a host by a main user at a presentation over a user channel;
receiving a request said-serve to perform a context verification decision from said host over a host channel;
creating a first template and a second template by said profile algorithm of said server;
sending an code object to said host over said host channel by said server;
wherein said code object is presented to a device of said main user at said presentation and over said user channel by said host;
wherein said device comprises said one or more applications;
wherein said code object triggers said one or more applications to contact said server, such that said server and said one or more applications mutually interrogate each other, such that one or more one-time signatures are algorithmically computed;
processing said first template by said server;
wherein said processing step of said first template is based upon one or more contextual factors;
populating said first template by said server;
creating and storing a first signature by said server;
wherein said creating step of said first signature is based upon said processing step of said first template;
wherein said code object is consumed by said main user on said device through said one or more applications;
wherein said creating and storing step of said first signature is based upon said consuming of said code object;
requesting said second template of said server over a smart channel by said one or more applications;
sending said second template to said one or more applications on said device over said smart channel by said server;
processing said second template by said one or more applications;
wherein said processing step of said second template is based upon of one or more contextual factors;
populating said second template by said one or more applications;
creating and storing a second signature by said one or more applications;
deleting said one or more contextual factors by said server;
wherein said creating step of said second signature is based upon said second template;
performing said context verification decision when comparing said first signature and said second signature over said smart channel by said server and said one or more applications; and
authenticating said device when said first signature is identical to said second signature.

* * * * *